US011367425B2

(12) United States Patent
Antao et al.

(10) Patent No.: US 11,367,425 B2
(45) Date of Patent: Jun. 21, 2022

(54) SONAR TRANSDUCER WITH MULTIPLE MOUNTING OPTIONS

(71) Applicant: NAVICO HOLDING AS, Egersund (NO)

(72) Inventors: Barry M. Antao, Owasso, OK (US); Jeremiah Clark, Tulsa, OK (US); Dustyn Pendergraft, Claremore, OK (US)

(73) Assignee: NAVICO HOLDING AS, Egersund (NO)

( * ) Notice: Subject to any disclaimer, the term of this patent is extended or adjusted under 35 U.S.C. 154(b) by 293 days.

(21) Appl. No.: 15/711,252

(22) Filed: Sep. 21, 2017

(65) Prior Publication Data
US 2019/0088239 A1 Mar. 21, 2019

(51) Int. Cl.
G10K 11/00 (2006.01)
G01S 7/521 (2006.01)
G01S 15/88 (2006.01)

(52) U.S. Cl.
CPC ............ G10K 11/006 (2013.01); G01S 7/521 (2013.01); G01S 15/88 (2013.01)

(58) Field of Classification Search
None
See application file for complete search history.

(56) References Cited

U.S. PATENT DOCUMENTS

| 1,667,540 | A | | 4/1928 | Dorsey |
| 1,823,329 | A | | 9/1931 | Marrison |
| 2,416,338 | A | | 2/1947 | Mason |
| 3,005,973 | A | * | 10/1961 | Kietz ................. G01S 15/8902 367/106 |

(Continued)

FOREIGN PATENT DOCUMENTS

| DE | 1566870 A1 | 4/1970 |
| DE | 3516698 A1 | 11/1986 |

(Continued)

OTHER PUBLICATIONS

"100 W adjustable Wide-Beam: Transom-Mount Transducer-P48W;" Airmar Technology Corporation; <www.airmar.com>.
"ITC Application Equations for Underwater Sound Transducers"; Published by International Transducer Corporation, 1995, Rev. Aug. 2000; 3 pages.
"Product Survey Side-Scan Sonar"; Hydro International Magazine; vol. 36; Apr. 2004; pp. 36-39.
"Transducers Quad Beam," Prior to Aug. 2, 2003; 1 page.
Airmar Press Release: Airmar Introduces P48W 200kHz Adjustable, Wide-Beam, Transom-Mount: Industry's widest 200 kHz transducer can help win fishing tournaments (Apr. 23, 2009).

(Continued)

Primary Examiner — Isam A Alsomiri
Assistant Examiner — Jonathan D Armstrong
(74) Attorney, Agent, or Firm — Nelson Mullins Riley & Scarborough LLP

(57) ABSTRACT

One or more transducer assemblies configured for multiple mounting options is provided. An example transducer assembly includes a housing configured to retain at least one sonar transducer. The housing includes a body having at least a top, a bottom, a first end, and a second end. The housing includes a first mounting feature integral to the housing and disposed proximate the first end, which is configured to mount the housing to a hull of watercraft to facilitate at least a first type of mounting. The housing also includes a second mounting feature integral to the housing and formed proximate the top of the body, which is configured to mount the housing to at least one of a watercraft or a trolling motor according to at least one second type of mounting. The at least one second type of mounting is different than the first type of mounting.

17 Claims, 16 Drawing Sheets

(56) References Cited

U.S. PATENT DOCUMENTS

| | | | |
|---|---|---|---|
| 3,090,030 A | 5/1963 | Schuck | |
| 3,142,032 A | 7/1964 | Jones | |
| 3,144,631 A | 8/1964 | Lustig et al. | |
| 3,296,579 A | 1/1967 | Farr, et al. | |
| 3,304,532 A | 2/1967 | Nelkin et al. | |
| 3,359,537 A | 12/1967 | Geil et al. | |
| 3,381,264 A | 4/1968 | Lavergne et al. | |
| 3,451,038 A | 6/1969 | Maass | |
| 3,458,854 A | 7/1969 | Murphree | |
| 3,484,737 A | 12/1969 | Walsh | |
| 3,496,524 A | 2/1970 | Stavis et al. | |
| 3,553,638 A * | 1/1971 | Sublett | B63C 11/48 367/12 |
| 3,585,578 A | 6/1971 | Fischer, Jr. et al. | |
| 3,585,579 A | 6/1971 | Dorr et al. | |
| 3,618,006 A | 11/1971 | Wright | |
| 3,624,596 A * | 11/1971 | Dickenson | G01S 7/34 367/114 |
| 3,716,824 A | 2/1973 | Door et al. | |
| 3,742,436 A | 6/1973 | Jones | |
| 3,753,219 A * | 8/1973 | King, Jr. | B63B 49/00 367/173 |
| 3,757,287 A | 9/1973 | Bealor, Jr. | |
| 3,781,775 A | 12/1973 | Malloy et al. | |
| 3,895,339 A | 7/1975 | Jones et al. | |
| 3,895,340 A * | 7/1975 | Gilmour | G01S 15/8902 367/7 |
| 3,898,608 A | 8/1975 | Jones et al. | |
| 3,907,239 A | 9/1975 | Ehrlich | |
| 3,922,631 A | 11/1975 | Thompson et al. | |
| 3,949,348 A | 4/1976 | Doff | |
| 3,950,723 A | 4/1976 | Gilmour | |
| 3,953,828 A * | 4/1976 | Cook | B06B 1/0607 367/155 |
| 3,964,424 A | 6/1976 | Hagemann | |
| 3,967,234 A | 6/1976 | Jones | |
| 3,975,704 A | 8/1976 | Klein | |
| 4,030,096 A * | 6/1977 | Stevens | G01S 7/527 342/90 |
| 4,047,148 A | 9/1977 | Hagemann | |
| 4,052,693 A | 10/1977 | Gilmour | |
| 4,063,212 A | 12/1977 | Sublett | |
| 4,068,209 A * | 1/1978 | Lagier | B06B 1/0618 367/158 |
| 4,075,599 A | 2/1978 | Kosalos et al. | |
| 4,121,190 A | 10/1978 | Edgerton et al. | |
| 4,184,210 A | 1/1980 | Hagemann | |
| 4,195,702 A | 4/1980 | Denis | |
| 4,197,591 A | 4/1980 | Hagemann | |
| 4,198,702 A | 4/1980 | Clifford | |
| 4,199,746 A | 4/1980 | Jones et al. | |
| 4,200,922 A | 4/1980 | Hagemann | |
| 4,204,281 A | 5/1980 | Hagemann | |
| 4,207,620 A | 6/1980 | Morgera | |
| 4,208,738 A | 6/1980 | Lamborn | |
| 4,216,537 A | 8/1980 | Delignieres | |
| 4,232,380 A | 11/1980 | Caron et al. | |
| 4,247,923 A | 1/1981 | De Kok | |
| 4,262,344 A | 4/1981 | Gilmour | |
| 4,287,578 A | 9/1981 | Heyser | |
| 4,347,591 A | 8/1982 | Stembridge et al. | |
| RE31,026 E | 9/1982 | Shatto | |
| 4,400,803 A | 8/1983 | Spiess et al. | |
| 4,413,331 A | 11/1983 | Rowe, Jr. et al. | |
| 4,422,166 A | 12/1983 | Klein | |
| 4,456,210 A * | 6/1984 | McBride | G10K 11/006 248/205.5 |
| 4,493,064 A | 1/1985 | Odero et al. | |
| 4,496,064 A | 1/1985 | Beck et al. | |
| 4,538,249 A * | 8/1985 | Richard | G01S 15/96 340/573.2 |
| 4,561,076 A | 12/1985 | Gritsch | |
| 4,596,007 A | 6/1986 | Grall et al. | |
| 4,635,240 A | 1/1987 | Geohegan, Jr. et al. | |
| 4,641,290 A | 2/1987 | Massa et al. | |
| 4,642,801 A | 2/1987 | Pemy | |
| 4,737,940 A * | 4/1988 | Arringotn | B63H 20/007 181/140 |
| 4,751,645 A | 6/1988 | Abrams et al. | |
| 4,774,837 A * | 10/1988 | Bird | G01P 5/245 73/181 |
| 4,796,238 A | 1/1989 | Bourgeois et al. | |
| 4,802,148 A | 1/1989 | Gilmour | |
| 4,815,045 A | 3/1989 | Nakamura | |
| 4,829,493 A | 5/1989 | Bailey | |
| 4,855,961 A | 8/1989 | Jaffe et al. | |
| 4,879,697 A | 11/1989 | Lowrance et al. | |
| 4,907,208 A * | 3/1990 | Lowrance | G01S 7/521 367/106 |
| 4,912,685 A | 3/1990 | Gilmour | |
| 4,924,448 A | 5/1990 | Gaer | |
| 4,935,906 A | 6/1990 | Baker et al. | |
| 4,939,700 A | 7/1990 | Breton | |
| 4,958,330 A | 9/1990 | Higgins | |
| 4,970,700 A * | 11/1990 | Gilmour | G01S 15/8902 367/88 |
| 4,972,387 A | 11/1990 | Warner | |
| 4,975,887 A | 12/1990 | Maccabee et al. | |
| 4,982,924 A * | 1/1991 | Havins | G01S 7/521 248/288.31 |
| 5,025,423 A | 6/1991 | Earp | |
| 5,033,029 A | 7/1991 | Jones | |
| 5,077,699 A | 12/1991 | Passamante et al. | |
| 5,109,364 A * | 4/1992 | Stiner | G10K 11/006 367/165 |
| 5,113,377 A | 5/1992 | Johnson | |
| 5,142,497 A * | 8/1992 | Warrow | G01S 7/521 367/12 |
| 5,142,502 A | 8/1992 | Wilcox et al. | |
| D329,615 S * | 9/1992 | Stiner | D10/104.1 |
| D329,616 S * | 9/1992 | Stiner | D10/104.1 |
| 5,155,706 A | 10/1992 | Haley et al. | |
| 5,182,732 A * | 1/1993 | Pichowkin | G10K 11/355 367/104 |
| 5,184,330 A * | 2/1993 | Adams | G01S 7/526 367/111 |
| 5,191,341 A | 3/1993 | Gouard et al. | |
| 5,200,931 A | 4/1993 | Kosalos et al. | |
| 5,214,744 A | 5/1993 | Schweizer et al. | |
| 5,231,609 A | 7/1993 | Gaer | |
| 5,237,541 A | 8/1993 | Woodsum | |
| 5,241,314 A | 8/1993 | Keeler et al. | |
| 5,243,567 A | 9/1993 | Gingerich | |
| 5,245,587 A | 9/1993 | Hutson | |
| 5,257,241 A | 10/1993 | Henderson et al. | |
| 5,260,912 A | 11/1993 | Latham | |
| 5,297,109 A * | 3/1994 | Barksdale, Jr | E02B 17/0034 367/104 |
| 5,299,173 A | 3/1994 | Ingram | |
| 5,303,208 A | 4/1994 | Dorr | |
| 5,376,933 A | 12/1994 | Tupper et al. | |
| 5,390,152 A | 2/1995 | Boucher et al. | |
| 5,412,618 A | 5/1995 | Gilmour | |
| 5,433,202 A | 7/1995 | Mitchell et al. | |
| 5,438,552 A | 8/1995 | Audi et al. | |
| 5,442,358 A | 8/1995 | Keeler et al. | |
| 5,455,806 A | 10/1995 | Hutson | |
| 5,485,432 A | 1/1996 | Aechter et al. | |
| 5,493,619 A | 2/1996 | Haley et al. | |
| 5,515,337 A | 5/1996 | Gilmour et al. | |
| 5,525,081 A * | 6/1996 | Mardesich | B63H 20/007 114/144 E |
| 5,526,765 A * | 6/1996 | Ahearn | B63B 49/00 114/221 R |
| 5,537,366 A | 7/1996 | Gilmour | |
| 5,537,380 A | 7/1996 | Sprankle, Jr. et al. | |
| 5,546,356 A | 8/1996 | Zehner | |
| 5,546,362 A | 8/1996 | Baumann et al. | |
| 5,561,641 A | 10/1996 | Nishimori et al. | |
| 5,574,700 A * | 11/1996 | Chapman | G10K 11/006 367/173 |
| 5,596,549 A | 1/1997 | Sheriff | |

(56) References Cited

U.S. PATENT DOCUMENTS

| | | |
|---|---|---|
| 5,596,550 A | 1/1997 | Rowe, Jr. et al. |
| 5,602,801 A | 2/1997 | Nussbaum et al. |
| 5,612,928 A | 3/1997 | Haley et al. |
| 5,623,524 A | 4/1997 | Weiss et al. |
| 5,675,552 A | 10/1997 | Hicks et al. |
| 5,694,372 A | 12/1997 | Perennes |
| 5,790,474 A | 8/1998 | Feintuch |
| 5,805,525 A | 9/1998 | Sabol et al. |
| 5,805,528 A | 9/1998 | Hamada et al. |
| 5,808,967 A | 9/1998 | Yu et al. |
| 5,838,635 A | 11/1998 | Masreliez |
| 5,850,372 A | 12/1998 | Blue |
| 5,930,199 A | 7/1999 | Wilk |
| 5,991,239 A | 11/1999 | Fatemi-Booshehri et al. |
| 6,002,644 A | 12/1999 | Wilk |
| 6,084,827 A | 7/2000 | Johnson et al. |
| 6,130,641 A | 10/2000 | Kraeutner et al. |
| 6,160,764 A * | 12/2000 | Powell ............... B63B 49/00 367/173 |
| 6,215,730 B1 | 4/2001 | Pinto |
| 6,225,984 B1 | 5/2001 | Crawford |
| 6,226,227 B1 | 5/2001 | Lent et al. |
| 6,273,771 B1 | 8/2001 | Buckley et al. |
| 6,285,628 B1 | 9/2001 | Kiesel |
| 6,321,158 B1 | 11/2001 | DeLorme et al. |
| 6,325,020 B1 | 12/2001 | Guigne et al. |
| 6,335,905 B1 | 1/2002 | Kabel |
| 6,411,283 B1 | 6/2002 | Murphy |
| 6,418,080 B2 | 7/2002 | Inouchi |
| 6,421,299 B1 | 7/2002 | Betts et al. |
| 6,421,301 B1 | 7/2002 | Scanlon |
| 6,445,646 B1 | 9/2002 | Handa et al. |
| 6,449,215 B1 | 9/2002 | Shell |
| 6,537,224 B2 | 3/2003 | Mauchamp et al. |
| 6,606,958 B1 | 8/2003 | Bouyoucos |
| 6,678,403 B1 | 1/2004 | Wilk |
| 6,738,311 B1 | 5/2004 | Guigne |
| 6,761,692 B2 | 7/2004 | Angelsen et al. |
| 6,771,564 B1 * | 8/2004 | Ramotowski ........ G10K 11/006 367/173 |
| 6,778,468 B1 | 8/2004 | Nishimori et al. |
| 6,816,782 B1 | 11/2004 | Walters et al. |
| 6,842,401 B2 | 1/2005 | Chiang et al. |
| 6,899,574 B1 * | 5/2005 | Kalis ............... B63J 99/00 367/173 |
| 6,904,798 B2 * | 6/2005 | Boucher ............. G01C 13/008 73/170.02 |
| 6,941,226 B2 | 9/2005 | Estep |
| 6,980,688 B2 | 12/2005 | Wilk |
| 7,002,579 B2 | 2/2006 | Olson |
| 7,035,166 B2 | 4/2006 | Zimmerman et al. |
| 7,036,451 B1 * | 5/2006 | Hutchinson ........... B63B 17/00 114/364 |
| 7,215,599 B2 | 5/2007 | Nishimori et al. |
| 7,236,426 B2 | 6/2007 | Turner et al. |
| 7,236,427 B1 * | 6/2007 | Schroeder ............. G01S 7/521 367/173 |
| 7,239,263 B1 | 7/2007 | Sawa |
| 7,242,638 B2 | 7/2007 | Kerfoot et al. |
| 7,305,929 B2 | 12/2007 | MacDonald et al. |
| 7,339,494 B2 | 3/2008 | Shah et al. |
| 7,355,924 B2 | 4/2008 | Zimmerman et al. |
| 7,369,459 B2 | 5/2008 | Kawabata et al. |
| 7,405,999 B2 * | 7/2008 | Skjold-Larsen ....... A01K 73/02 367/106 |
| 7,430,461 B1 | 9/2008 | Michaels |
| 7,542,376 B1 * | 6/2009 | Thompson ............. G01S 15/89 367/104 |
| 7,652,952 B2 * | 1/2010 | Betts .................. G01S 7/521 367/88 |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,839,720 B2 | 11/2010 | Brumley et al. |
| 7,870,496 B1 | 1/2011 | Sherwani |
| 7,889,600 B2 | 2/2011 | Thompson et al. |
| 7,890,867 B1 | 2/2011 | Margulis |
| 7,961,552 B2 | 6/2011 | Boucher et al. |
| 8,019,532 B2 | 9/2011 | Sheha et al. |
| 8,063,540 B2 | 11/2011 | Angelsen et al. |
| 8,300,499 B2 * | 10/2012 | Coleman ............... G01S 15/87 367/88 |
| 8,305,840 B2 * | 11/2012 | Maguire ............... G01S 15/89 367/88 |
| 8,305,841 B2 | 11/2012 | Riordan et al. |
| 8,514,658 B2 | 8/2013 | Maguire |
| 8,605,550 B2 | 12/2013 | Maguire |
| 9,142,206 B2 * | 9/2015 | O'Dell ............... G10K 11/006 |
| 10,351,220 B1 * | 7/2019 | Witte ................ G10K 11/006 |
| 2001/0026499 A1 | 10/2001 | Inouchi |
| 2002/0013106 A1 * | 1/2002 | Healey ................ B63H 20/007 440/6 |
| 2002/0035574 A1 | 3/2002 | Dumas |
| 2002/0044500 A1 * | 4/2002 | Hansen ................ G01S 15/88 367/173 |
| 2002/0071029 A1 | 6/2002 | Zell et al. |
| 2002/0085452 A1 * | 7/2002 | Scanlon ............... G01S 7/521 367/188 |
| 2002/0093541 A1 | 7/2002 | Schileru-Key |
| 2002/0126577 A1 | 9/2002 | Borchardt |
| 2003/0202426 A1 | 10/2003 | Ishihara et al. |
| 2003/0206489 A1 | 11/2003 | Preston et al. |
| 2003/0214880 A1 | 11/2003 | Rowe |
| 2004/0184351 A1 | 9/2004 | Nishimori et al. |
| 2004/0193364 A1 | 9/2004 | Chojnacki |
| 2004/0221468 A1 | 11/2004 | Cotterchio et al. |
| 2005/0036404 A1 | 2/2005 | Zhu et al. |
| 2005/0043619 A1 | 2/2005 | Sumanaweera et al. |
| 2005/0099887 A1 | 5/2005 | Zimmerman et al. |
| 2005/0102101 A1 | 5/2005 | Beesley et al. |
| 2005/0216487 A1 | 9/2005 | Fisher et al. |
| 2006/0002232 A1 | 1/2006 | Shah et al. |
| 2006/0013066 A1 | 1/2006 | Nishimori et al. |
| 2006/0023570 A1 * | 2/2006 | Betts .................. G01S 7/521 367/88 |
| 2006/0114748 A1 * | 6/2006 | Rogers ................ G01S 15/89 367/88 |
| 2006/0119585 A1 | 6/2006 | Skinner |
| 2006/0224940 A1 | 10/2006 | Lee |
| 2007/0025183 A1 | 2/2007 | Zimmerman et al. |
| 2007/0091723 A1 | 4/2007 | Zhu et al. |
| 2007/0159922 A1 | 7/2007 | Zimmerman et al. |
| 2008/0013404 A1 | 1/2008 | Acker et al. |
| 2008/0126935 A1 | 5/2008 | Blomgren |
| 2008/0137483 A1 | 6/2008 | Sawrie |
| 2008/0204424 A1 | 8/2008 | Jin et al. |
| 2009/0031940 A1 | 2/2009 | Stone et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng |
| 2009/0287409 A1 | 11/2009 | Summers |
| 2010/0054084 A1 * | 3/2010 | Boucher ............... G01S 7/521 367/118 |
| 2010/0080082 A1 | 4/2010 | Betts |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2010/0277379 A1 * | 11/2010 | Lindackers ........... H01Q 1/1207 343/713 |
| 2011/0007606 A1 | 1/2011 | Curtis |
| 2011/0012773 A1 | 1/2011 | Cunning et al. |
| 2011/0013484 A1 * | 1/2011 | Coleman ............... G01S 15/87 367/88 |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2011/0238762 A1 | 9/2011 | Soni et al. |
| 2012/0001773 A1 | 1/2012 | Lyons et al. |

(56) References Cited

U.S. PATENT DOCUMENTS

| | | | |
|---|---|---|---|
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0185801 A1 | 7/2012 | Madonna et al. | |
| 2013/0007665 A1 | 1/2013 | Chaudhri et al. | |
| 2013/0016588 A1* | 1/2013 | O'Dell | G10K 11/006 367/173 |
| 2013/0148471 A1 | 6/2013 | Brown et al. | |
| 2013/0208568 A1 | 8/2013 | Coleman | |
| 2014/0010048 A1 | 1/2014 | Proctor | |
| 2014/0064024 A1 | 3/2014 | Maguire | |
| 2015/0294660 A1* | 10/2015 | Stokes | G01S 15/86 367/173 |
| 2016/0180827 A1* | 6/2016 | Caldwell | A01K 97/00 367/173 |
| 2016/0362164 A1* | 12/2016 | Page | B63B 49/00 |

FOREIGN PATENT DOCUMENTS

| | | |
|---|---|---|
| EP | 1272870 B1 | 4/2004 |
| EP | 1393025 B1 | 2/2006 |
| EP | 2023159 A1 | 2/2009 |
| EP | 2070068 B1 | 12/2011 |
| GB | 823304 A | 11/1959 |
| GB | 1306769 A | 2/1973 |
| GB | 1315651 A | 5/1973 |
| GB | 1316138 A | 5/1973 |
| GB | 1329829 A | 9/1973 |
| GB | 1330472 A | 9/1973 |
| GB | 2111679 A | 7/1983 |
| GB | 2421312 A | 6/2006 |
| GB | 2444161 A | 5/2008 |
| JP | S 50109389 U | 9/1975 |
| JP | S 5454365 U | 4/1979 |
| JP | S 5746173 A | 3/1982 |
| JP | S 5879178 A | 5/1983 |
| JP | S 59107285 A | 6/1984 |
| JP | S 61102574 A | 5/1986 |
| JP | S 61116678 A | 6/1986 |
| JP | S 61262674 A | 11/1986 |
| JP | S 6299877 U | 6/1987 |
| JP | S 62134084 U | 8/1987 |
| JP | S 62190480 A | 8/1987 |
| JP | S 63261181 A | 10/1988 |
| JP | H 02159591 A | 6/1990 |
| JP | H 0385476 A | 4/1991 |
| JP | H 04357487 A | 12/1992 |
| JP | H 0731042 A | 1/1995 |
| JP | H 07270523 A | 10/1995 |
| JP | H 10123247 A | 5/1998 |
| JP | H 10132930 A | 5/1998 |
| JP | H 10186030 A | 7/1998 |
| JP | H 10325871 A | 12/1998 |
| JP | 2001074840 A | 3/2001 |
| JP | 2002168592 A | 6/2002 |
| JP | 2004020276 A | 1/2004 |
| JP | 2004219400 A | 8/2004 |
| JP | 2005091307 A | 4/2005 |
| JP | 2006064524 A | 3/2006 |
| JP | 2006162480 A | 6/2006 |
| JP | 2006208300 A | 8/2006 |
| JP | 2008508539 A | 3/2008 |
| JP | 2008128900 A | 6/2008 |
| JP | 2009222414 A | 10/2009 |
| JP | 4357487 B2 | 11/2009 |
| JP | 2010030340 A | 2/2010 |
| WO | WO 1984001833 A | 5/1984 |
| WO | WO 1991002989 A1 | 3/1991 |
| WO | WO 1998015846 A1 | 4/1998 |
| WO | WO 2003009276 A | 1/2003 |
| WO | WO 2005057234 A | 6/2005 |
| WO | WO 2008105932 A | 9/2008 |
| WO | WO 2008152618 A | 12/2008 |
| WO | WO 2011008429 A | 1/2011 |

OTHER PUBLICATIONS

Airmar Technology Corporation Brochure DST800 Retractable Transducer System Sep. 2005.

Airmar Technology Corporation Brochure/Presentation: Guide to Transducer Technology (Aug. 18, 2010).

Airmar Technology Corporation Datasheet: P48W Transom-Mount Adjustable Wide-Beam, (Dec. 2010).

Airmar Technology Corporation, R209 Dual Frequency 2 to 3 W Transducer; Oct. 10, 2007; 2 pages.

Airmar Technology Corporation, R99 Dual Frequency 2kW Transducer; May 2, 2006; 2 pages.

Alpine Geophysical Data Programmer Model 485C Brochure and letter dated Feb. 17, 1976; 2 pages.

Anderson, K.; "Side-Scanning for Sport Fishing"; Salt Water Sportsman; Apr. 1, 2009; 4 pages.

Andrew, C., et al.; "Setup and Trouble shooting Procedures for the Klein 5500 Sidescan Sonar"; Australian Government; Department of Defence; Maritime Operations Division; Systems Sciences Laboratory; Published Nov. 2003.

Armstrong, A.A., et al.; "New Technology for Shallow Water Hydrographic Surveys"; Proceedings of the 25th Joint Meeting of UJNR Sea-bottom Surveys Panel; Dec. 1996.

Asplin, R.G., et al.; "A new Generation Side Scan Sonar"; Oceans '88 Proceedings. 'A Partnership of Marine Interests'; vol. 2; Oct.-Nov. 1988; pp. 329-334.

Australian Government, Department of Sustainability, Environment, Water, Popluation and Communities; Fact Sheet—The RV Tangaroa; date unknown; 3 pages.

Avera W., et al., Multibeam Bathymetry from a Mine-Hunting Military Sonar, Report No. NRL/JA/7440-02-1010, Naval Research Laboratory and Naval Oceanographic Office, (Nov. 2002).

Baker, N., et al, "Rifting History of the Northern Mariana Trough: SeaMARCH II and Seismic Reflection Surveys," Journals of Geophysical Research, vol. 101, No. B5, May 10, 1996.

Ballantyne, J.; "Find and Catch More Fish, Quickly and Easily, with the Fishin' Buddy 2255"; [Online]; [Retrieved on Dec. 7, 2011]; Retrieved from the Internet URL:<http://www.articleslash.net/Recreation-and-Sports/Fishing/67018-Find-and-Catch-More-Fish-Quickly-and-Easily-with-the-FISHIN-BUDDY-2255.html>; 4 pages.

Barbu, C., et al., AQS-20 Sonar Processing Enhancement for Bathymetry Estimation, pp. 1-5, Presented at Oceans Conference (2005).

Barbu, Madalina, "Acoustic Seabed and Target Classification using Fractional Fourier Transform and Time-Frequency Transform Techniques" Dissertation Paper 480, University of New Orleans (2006).

Barnum, S.R. CDR, Descriptive Report to Accompany Hydrographic Survey Side, Scan Sonar / Multibeam Survey of Portsmouth Harbor, Survey No. H11014 (2001).

Bass, G. New Tools for Undersea Archeology, National Geographic, vol. 134, pp. 403-422 (1968).

Benthien, George W, and Hobbs, Stephen, Technical Report: Modeling of Sonar Transducers and Arrays, Sep. 2005.

Benthos C3D Sonar Imaging System; "High Resolution Side Scan Imagery with Bathymetry"; Benthos, Inc.; © May 2002.

Berktay, H. O., et al., "Farfield performance of parametric transmitters;" Journal of Acoustical Society of America, vol. 55, No. 3; dated Mar. 1974.

Blondel, Philippe; The Handbook of Sidescan Sonar; © 2009; 316 pages.

Buchanana, H.L. and Lt. Cmdr. John M. Cottingham, Countering Mines in 2005, Sea Technology, vol. 41, No. 1, pp. 24-29, (Jan. 2000).

Calcutt, Ron; Lowrance Book of Sonar & GPS; © 1986; and Lowrance Book of Sonar & GPS Update; 1997; collectively 122 pages.

(56) References Cited

OTHER PUBLICATIONS

Carey, W.M., "Sonar Array Characterization, Experimental Results"; IEEE Journal of Oceanic Engineering ; vol. 23; Issue 3; Jul. 1998; pp. 297-306.

Chesterman, W.D., Clynick, P.R., and Stride, A.H., An Acoustic Aid to Sea Bed Survey, Acustica, pp. 285-290, Apr. 1958.

Clausner, J. Coastal Engineering Technical Note: Side Scan Sonar for Inspecting Coastal Structures, CETN-III-16, U.S. Army Engineer Waterways Experiment Station, (Nov. 1983).

Clausner, J.E. and Pope, J., 1988. "Side-scan sonar applications for evaluating coastal structures"; U.S. Army Corps of Engineers, Technical Report CERC-88-16; 80 pages.

Coastal Engineering Technical Note; "Side-Scan Sonar for Inspecting Coastal Structures"; U.S. Army Engineer Waterways Experiment Station; Revised Nov. 1983.

Communication [extended European Search Report] for European Application No. 05782717.2-2220 dated Aug. 31, 2011; 12 pages.

Communication for European Patent Application No. 05782717.2-2220 dated May 11, 2012; 9 pages.

ConCAT Containerised Catamaran; Inshore hydrographic survey vessel that fits in a container; In Cooperation with Uniteam International; Kongsberg Simrad AS; Apr. 2004.

Cowie, P.A., et al., "Quantitative Fault Studies on the East Pacific Rise: A Comparison of Sonar Imaging Techniques," Journal of Geophysical Research, vol. 99, B8, Aug. 10, 1994.

Craig, J.D., Engineering and Design: Evaluation and Repair of Concrete Structures, Manual No. 1110-2-2002, US Army Corps of Engineers, Department of the Army (Jun. 1995).

Curcio, J., et al.; "SCOUT—A Low Cost Autonomous Surface Platform for Research in Cooperative Autonomy"; Department of Mechincal Engineering; Massachusetts Institute of Technology; Aug. 2005.

Cyr, Reginald, A Review of Obstacle Avoidance/Search Sonars Suitable for Submersible Applications, Marine Tech. Soc. Journal., vol. 20, No. 4, pp. 47-57(Dec. 1986).

Datasheet / Specification for Imagenex Sportscan, (Aug. 2005).

Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.

De Jong, C. D., et al.; "Hydrography: Series on Mathematical Geodesy and Positioning;" VSSD; ISBN 90-407-2359-1; dated 2002.

Decision for Inter Partes Review of U.S. Pat. No. 8,305,840; IPR2013-00355; dated Dec. 12, 2013; United States Patent and Trademark Office; 36 pages.

Decision for Inter Partes Review of U.S. Pat. No. 8,305,840; IPR2013-00496; dated Feb. 11, 2014; United States Patent and Trademark Office; 14 pages.

Decision for Inter Partes Review of U.S. Pat. No. 8,305,840; IPR2013-00497; dated Feb. 11, 2014; United States Patent and Trademark Office; 17 pages.

Declaration of Paul Stokes for Inter Partes Review of U.S. Pat. No. 8,305,840; IPR2013-00355; dated Jun. 12, 2013; Raymarine, Inc.; 118 pages.

Declaration of Paul Stokes for Inter Partes Review of U.S. Pat. No. 8,305,840; IPR2013-00496; dated Aug. 2, 2013; Raymarine, Inc.; 124 pages.

Declaration of Paul Stokes for Inter Partes Review of U.S. Pat. No. 8,305,840; IPR2013-00497; dated Aug. 2, 2013; Raymarine, Inc.; 166 pages.

Deep Vision Side Scan Sonar Systems; [Online]; [Retrieved on Dec. 2, 2011]; Retrieved from the Internet URL:<http://www.deepvision.se/products.htm>; 5 pages.

Denny, M., Blip, Ping, and Buzz, JHU Press, 1st ed. (2007).

DeRoos, Bradley G. et al., Technical Survey and Evaluation of Underwater Sensors and Remotely Operated Vehicles; May 1993; 324 pages.

Derrow, II, Robert W. et al., A Narrow-Beam, Side-Looking Sonar for Observing and Counting Fish in Shallow Aquaculture Ponds; 1996; 34 pages.

Detailed Sonar Transducer Product Information; Transducer Products; Side Scans; Models T36, T63, T62, and T403; Dec. 30, 2003; Retrieved from internet: URL: ; 4 pages.

Detailed Sonar Transducer Product Information; Transducer Products; Side Scans; Models T36, T63, T62, and T403; Dec. 30, 2003; Retrieved from internet: URL: <http://www.neptune-sonar.com/products.as-btype=Side-Scan+Transducers&category=>; 4 pages.

Donovan, D.T., Stride, A.H., and Lloyd, A.J., An Acoustic Survey of the Sea Floor South of Dorset and its Geological Interpretation, Philosophical Transactions of the Royal Society of London, Series B, Biological Sciences, pp. 299-330 (Nov. 1961).

DSME E&R Ltd.; Remotely Operated Sonar Boat System (SB-100S); <http://dsmeu.en.ec21.com/Remotely-Operated-Sonar-Boat-System-618904-2479905.html>; printed on Feb. 12, 2010; 3 pages.

EA 400/600 Sidescan: Echo Sounder with Combined Sidescan and Depth Soundings, Konigsberg Maritime AS, (Nov. 2005).

Eagle Electronics; Ultra 3D Installation and Operation Manual; © 2002; 24 pages.

EdgeTech 2000-CSS Integrated Coastal System Subscan Brochure (date unknown).

EDO Corporation Global Technology Reach, Model 6400 Fan Beam Transducer; <http:/web/archive/org/web/20040608054923/www.edoceramic.con/NavDucers.htm>; Jun. 3, 2004.

Elmore, P.A., et al., Environmental Measurements Derived from Tactical Mine Hunting Sonar Data, pp. 1-5, Presented at Oceans Conference (2007).

EM1110-2-1003; Department of the Army; U.S. Army Corps of Engineers; Engineering and Design; Hydrographic Surveying; Apr. 1, 2004.

Elmore, P.A. et al., Use of the AN/AQS-20A Tactical Mine-hunting System for On-scene Bathymetry Data, Journal of Marine Systems, vol. 78, pp. 5425-5432(Feb. 2008).

Extended European Search Report for Application No. 13153403.4; dated May 7, 2013.

Farrell, E.J.; , "Color Display and Interactive Interpretation of Three-Dimensional Data"; IBM Journal of Research and Development; vol. 27; No. 4; Jul. 1983; pp. 356-366.

U.S. Appl. No. 60/552,769, filed Mar. 12, 2004; Applicant: Terrence Schroeder.

Final Report; Early Implementation of Nearshore Ecosystem Database Project Tasks 2 and 3; [online]; Retrieved on Feb. 26, 2010 from the Internet URL: <http://seafloor.csumb.edu/taskforce/html%202%20web/finalreport.htm>; 90 pages.

FishFinder L265 Instruction Manual; Raymarine; 79 pages.

FishFinder L365 Instruction Manual; Raymarine; 83 pages.

FishFinder L470 Instruction Manual; Raymarine; 102 pages.

FishFinder L750 Instruction Manual; Raymarine; 93 pages.

Fishin' Buddy 4200™ Operations Manual; Dated Dec. 21, 2005; 16 pages.

Fishing Tool Reviews—Bottom Line Fishin Buddy 1200 Fishfinder; [Online]; [Retrieved on Dec. 7, 2011]; Retrieved from the Internet URL:<http://www.tackletour.com/reviewbottomline1200.html>; 4 pages.

Flemming, B.W., M. Klein, P.M. Denbigh, Recent Developments in Side Scan Sonar Techniques, (1982).

Flemming, B.W., Side-Scan Sonar: A Practical Guide, International Hydrographic, pp. 65-92 (Jan. 1976).

Fried, N. W.; "An Investigation of a Large Step-Down Ratio Parametric Sonar and Its Use in Sub-Bottom Profiling;" Thesis: Simon Fraser University; dated Aug. 1992.

Furuno Electric Co., Ltd.; Side Looking Sonar, Model SL-16, 1983; 4 pages.

Gallaudet, T.C., et al., Multibeam Volume Acoustic Backscatter Imagery and Reverberation Measurements in the Northeastern Gulf of Mexico, J. Acoust. Soc. Am., vol. 112, No. 2, pp. 489-503 (Aug. 2002).

Garmin GPSMAP 3206/3210 Color Chartplotter Owner's Manual (Jun. 2006).

Garmin; GPSMAP® 4000/5000 Series, Owner's Manual; 2007; 54 pages.

(56) References Cited

OTHER PUBLICATIONS

GeoAcoustics, GeoSwath Operation Manual Swath 6100/B (Sep. 1998).

GeoAcoustics, GeoSwath Product Bulletin (2000).

GeoAcoustics; A Kongsberg Company; GeoSwath Plus Brochure; "Wide swath bathymetry and georeferenced side scan"; [Online]; Retrieved from the internet URL: <http://www.km.kongsberg.com/ks/web/nokbg0397.nsf/AllWeb/F4B7FD3461368388C125-7599002D34BC/$file/GeoSwath-Plus-brochure.pdf?OpenElement>.

GeoAcoustics; GeoPulse, Profiler System; Feb. 2006, 2 pages.

GeoPulse; GeoAcoustics Pinger Sub-Buttom Profiler; Retrieved from the Internet URL: <http://www.km.kongsberg.com/ks/web/nokbg0397.nsf/AllWeb/D1084BB7DDOFD21DC12574C0003E01EA/$file/GeoPulse-Profiler.pdf?OpenElement>, GeoAcoustics Limited, UK; A Kongsberg Company.

GlobalMap Sport; Installation and Operation Instructions; Lowrance Electronics, Inc.; © 1996; 61 pages.

Glynn, Jr., J.M., et al.; "Survey Operations and Results Using a Klein 5410 Bathymetric Sidescan Sonar"; Retrieved from the Internet URL:<http://www.thsoa.org/hy07/03-04.pdf>; Mar. 2007.

GPS Speed Correction; Sidescan Sonar; [online]; Retrieved from the Internet URL: <www.hydrakula.uni-kiel.de/downloads/Sidescan%20Sonar.doc>; 10 pages.

Hansen, H.H.; "Circular vs. rectangular transducers"; Department of Electroncis and Telecommunications; Norwegian University of Science and Technology; Mar. 2010; 28 pages.

Hansen, R.E., Introduction to Sonar, Course Material to INF-GEO4310, University of Oslo, (Oct. 7, 2009).

Hardiman, J. E., et al.; "High Repetition Rate Side Looking Sonar;" Oceans 2002 MTSIEEE, vol. 4; dated Oct. 2002.

Hare, M.R., "Small-Boat Surveys in Shallow Water", 2008 Institute of Ocean Sciences, Marine habitat mapping Technology for Alaska; 19 pages.

Harris, M.M., et al., Tow Vehicle Depth Verification, Oceans 2002 IEEE/MTS Conference Proceedings, pp. 1199-1202 (Oct. 2002).

Hayes, M.P. and Ho, T.Y., 2000. "Height estimation of a sonar towfish from sidescan imagery", Hamilton: Proc. Image Vision Computing New Zealand; 6 pages.

Hersey, J. B, et al., Sonar Uses in Oceanography, Presented at Instrument Automation Conference and Exhibit, New York, NY, Sep. 1960.

Hogarth, P., Low Cost Swath Bathymetry: Widening the swath bathymetry market, Hydro International (Jul. 2000).

Hughes Clarke, J. E., et al.; Knudsen 320 200 kHz keel-mounted sidescan trials; Results from 2000/2001/2002 field operations; [online]; Retrieved on Jun. 23, 2010 from the Internet URL: <http://www.omg.unb.ca/Ksidescan/K320-SStrials.html>; 11 pages.

Hughes Clarke, J.E.; "Seafloor characterization using keel-mounted sidescan: proper compensation for radiometric and geometric distortion"; Canadian Hydrographic Conference; May 2004; 18 pages.

Humminbird "Matrix 35 Fishing System," Prior to Aug. 2, 2003.

Humminbird "Matrix 97 GPS Trackplotter Operations Manual" 2003.

Humminbird "The Product Line>Matrix Products>Matrix 35" <http://web.archive.org/web/20030404000447/www.humminbird.com/hb-Products.asp?ID>, Apr. 4, 2003.

Humminbird "Wideside"; Schematic; Dec. 15, 1994; 5 pages.

Humminbird 100 Series™ Fishin' Buddy®; 110, 120, 130 and 140c Product Manual; © 2007; 2 pages.

Humminbird 1100 Series Operations Manual; © 2007; 196 pages.

Humminbird 1197c Operations Manual; Nov. 6, 2007; 196 pages.

Humminbird 1198C Review for Catfishing, Catfishing "How to" Catfishing Techniques, Oct. 31, 2011, 9 pages.

Humminbird 200DX Dual Beam Operations Manual; 43 pages.

Humminbird 500 Series; 550, 560, 570 and 570 DI Operations Manual; © 2010; pp. 84.

Humminbird 757c, 787c2 and 757c2i GPS Chartplotter Operations Manual 2006; 161 pages.

Humminbird 997c SI Combo Installation and Operations Manual 2008; 151 pages.

Humminbird Dimension 3 Sonar 600 Operations Manual; 24 pages.

Humminbird GPS NS 10 Operations Manual; 75 pages.

Humminbird High Speed Transducer; 4 pages.

Humminbird LCR 400 ID Operations Manual; 28 pages.

Humminbird Marine Information Systems; Dimension 3 Sonar™; 1992; 16 pages.

Humminbird Matrix 35 Fishing System; 2 pages.

Humminbird Matrix 55 and 65 Operations Manual; © 2003; 40 pages.

Humminbird Matrix 67 GPS Trackplotter Operations Manual; © 2003; 88 pages.

Humminbird Matrix 97 Operations Manual; © 2003; 87 pages.

Humminbird Matrix™ 87c Operations Manual; 45 pages.

Humminbird NS25 Operations Manual; 71 pages.

Humminbird Piranha 1 & 2 Operation Guide; 5 pages.

Humminbird Platinum ID 120 Operations Manual; 36 pages.

Humminbird Platinum ID 600 Operations Manual; 18 pages.

Humminbird The New Wave of Wide; 1997; Humminbird Wide®; fish wide open!®; 24 pages.

Humminbird Wide 3D Paramount Operations Manual; 44 pages.

Humminbird Wide 3D View Operations Manual; 38 pages.

Humminbird Wide Brochure 1997; fish wide open!; 4 pages.

Humminbird Wide Eye Operations Manual; 32 pages.

Humminbird Wide Optic Operations Manual 1997; fish wide open!: 32 pages.

Humminbird Wide Paramount Operations Manual; fish wide open!; 32 pages.

Humminbird: America's favorite Fishfinder-the leading innovator of Side Imaging technology; [Online]; [Retrieved on Mar. 16, 2011]; Retrieved from the Internet URL: <http://www.humminbird.com/support/ProductManuals.aspx>; 20 pages.

Humminbird® Trolling Motor Mounted Transducer with Mount Assembly Brochure; © 2008 Humminbird®, Eufaula, AL; 2 pages.

Hussong, D.M., et al., "High-Resolution Acoustic Seafloor Mapping," 20th Annual OTC, Houston, TX, May 2-5, 1988.

Hydro Products; A Tetra Tech Company; 4000 Series Gifft Precision Depth Recorder Product Brochure; date stamped 1977.

Hydro Surveys: Side Scan Sonar Systems, Hydro International (2008).

HyPack Inc,: HyPack Software User Manual (date unknown).

Imagenex Model 855 Brochure: Online; Documents retrieved from internet web archives as follows: URL:<http://web.archive.org/web/20021023212210/http:/www.imagenex.com/Products/855-858/855-858.html>; 1 page; Archived on Oct. 23, 2002 URL:http://web.archive.org/web/20021024124035/http:/www.imagenex.com/Products/855-858/855/855.html; 1 page; Archived on Oct. 24, 2002 URL:<http://web.archive.org/web/20021024125254/http:/www.imagenex.com/Products/855-858/858/858.html>; 1 page; Archived on Oct. 24, 2002 URL:<http://web.archive.org/web/20030424071306/http:/www.imagenex.com//85-5-Page-1.jgp>; 1 page; Archived on Apr. 24, 2003 URL: <http://web.rchive.org/web/20030424091547/http:/www.imagenex.com/855-Page-2.jpg>; 1 page; Archived on Apr. 24, 2003 URL: <http://web.archive.org/web/20030424094158/http:/www.imagenex.com/855-Page-3.jpg>; 1 page; Archived on Apr. 24, 2003 URL:<http://web.archive.org/web/20030424101301/http:/www.imagenex.com/85-5-Page-5.jpg>; 1 page; Archived on Apr. 24, 2003 URL:<http://w Imagenex Model 855 User's Manual (Nov. 1991).

Imagenex Model 858 User's Manual (May 1999).

Imagenex Model 872 "Yellowfin" Sidescan Sonar; Imagenex Technology Corp.; © 2004-2009; 107 pages.

Imagenex SportScan Digital SideScan Sonar Brochure: Online; Documents retrieved from internet web archives as follows: URL:<http://web.archive.org/web/20030212030409/http://www.imagenex.com/Products/products.html>; 1 page; Archived on Feb. 12, 2003 URL:<http://web.archive.org/web/20030214044915/http://www.imagenex.com/Products/SportScan/sportscan.html>; 1 page; Archived on Feb. 14, 2003 URL:<http://web.archive.org/web/20030222152337/http://www.imagenex.com/Products/SportScan/SportScan-Specs/sportscan-specs.html>; 3 pages; Archived on Feb. 22, 2003 URL:<http://web.archive.org/web/20030222161450/http://www.imagenex.com/

(56) References Cited

OTHER PUBLICATIONS

Products/SportScan/FAQ-s/faq-s.html>; 4 pages; Archived on Feb. 22, 2003 URL:<http://web.archive.org/web/20030419024526/http://www.imagenex.com/Products/SportScan/distributors.html>; 2 pages; Archived on Apr. 19, 2003.
Imagenex Sportscan Installation / Setup Manual (date unknown).
Imagenex Technology Corp., Model 881 Digital Tilt Adjust Imaging Sonar; Hardware Specifications; Aug. 12, 2002; 3 pages.
Imagenex Technology Corp., Model 881 SportScan, Single or Dual Frequency Digital Sidescan Sonar, Software User's Manual; May 9, 2003; 16 pages.
Imagenex Technology Corp.; YellowFin SideScan Sonar, (Model 872); use's manual; data storage file format; Ethernet interface specification, and Ethernet setup guide; Nov. 2004; 46 pages.
Innomar-Products; "System Variants: SES Side Scan Option"; Retrieved from internet URL:<http://www.innomar.com/produ-2000sidescan.htm>; Dec. 30, 2003; 2 pages.
International Preliminary Report on Patentability for Application No. PCT/US05/27436 dated Dec. 6, 2007; 5 pages.
International Search Report and Written Opinion for Application No. PCT/US2010/039441 dated Oct. 11, 2010.
International Search Report and Written Opinion for Application No. PCT/US2010/039443 dated Oct. 6, 2010.
International Search Report and Written Opinion for Application No. PCT/US2012/046062 dated Dec. 14, 2012.
International Search Report for Application No. PCT/US05/27436 dated Nov. 20, 2007; 1 page.
Invalidity Contention; U.S. Pat. No. 8,300,499 Invalidity Claim Chart; Exhibit B01-Tri-Beam; Feb. 12, 2014; 31 pages.
Invalidity Contention; U.S. Pat. No. 8,300,499 Invalidity Claim Chart; Exhibit B02-Hydrography, Humminbird 757 c; Feb. 12, 2014; 38 pages.
Invalidity Contention; U.S. Pat. No. 8,300,499 Invalidity Claim Chart; Exhibit B03-Airmar-R209, Humminbird 757 c; Feb. 12, 2014; 43 pages.
Invalidity Contention; U.S. Pat. No. 8,300,499 Invalidity Claim Chart; Exhibit B04-Airmar-R209, Hydrography, Humminbird 757c, Sato, Aimar-R99, Zimmerman; Feb. 12, 2014; 59 pages.
Invalidity Contention; U.S. Pat. No. 8,300,499 Invalidity Claim Chart; Exhibit B05-Odom Echoscan; Feb. 12, 2014; 45 pages.
Invalidity Contention; U.S. Pat. No. 8,300,499 Invalidity Claim Chart; Exhibit B06-Kongsberg EA 400/600; Feb. 12, 2014; 37 pages.
Invalidity Contention; U.S. Pat. No. 8,300,499 Invalidity Claim Chart; Exhibit B07-Nishimori, Thompson, Betts, Zimmerman, Melvin: Tri-Beam, Odom Echoscan; Feb. 12, 2014; 22 pages.
Invalidity Contention; U.S. Pat. No. 8,300,499 Invalidity Claim Chart; Exhibit B08-Hydrogaphy, Betts et al, Humminbird 997c and 757c; Feb. 12, 2014; 61 pages.
Invalidity Contention; U.S. Pat. No. 8,300,499 Invalidity Claim Chart; Exhibit B09-Humminbird 997c; Feb. 12, 2014; 40 pages.
Invalidity Contention; U.S. Pat. No. 8,300,499 Invalidity Claim Chart; Exhibit B10-Betts; Feb. 12, 2014; 29 pages.
Invalidity Contention; US. Pat. No. 8,305,840 Invalidity Claim Chart; Exhibit A01-Hydrography; Feb. 12, 2014; 30 pages.
Invalidity Contention; U.S. Pat. No. 8,305,840 Invalidity Claim Chart; Exhibit A02-Hydrography, Lustig; Feb. 12, 2014; 42 pages.
Invalidity Contention; U.S. Pat. No. 8,305,840 Invalidity Claim Chart; Exhibit A03-Hyarography, Adams; Feb. 12, 2014; 49 pages.
Invalidity Contention; U.S. Pat. No. 8,305,840 Invalidity Claim Chart; Exhibit A04-Hydrography, Boucher '522; Feb. 12, 2014; 39 pages.
Invalidity Contention; U.S. Pat. No. 8,305,840 Invalidity Claim Chart; Exhibit A05-Hydrography, Boucher '522; Adams; Feb. 12, 2014; 54 pages.
Invalidity Contention; U.S. Pat. No. 8,305,840 Invalidity Claim Chart; Exhibit A06-Hydrography, Adam, Betts; Feb. 12; 2014; 29 pages.
Invalidity Contention; US. Pat. No. 8,305,840 Invalidity Claim Chart; Exhibit A07-Hydrography, Boucher '522, Adam, Betts; Feb. 12, 2014; 33 pages.
Invalidity Contention; U.S. Pat. No. 8,305,840 Invalidity Claim Chart; Exhibit A08-Hydrography, Boucher '798, DeRoos; Adams; Feb: 12, 2014; 46 pages.
Invalidity Contention; U.S. Pat. No. 8,305,840 Invalidity Claim Chart; Exhibit A09-Hydrography, Boucher '798, DeRoos; Adams, Betters; Feb. 12,1014; 33 pages.
Invalidity Contention; U.S. Pat. No. 8,305,840 Invalidity Claim Chart; Exhibit A10-Furuno; Feb. 12, 2014; 58 pages.
Invalidity Contention; U.S. Pat. No. 8,305,840 Invalidity Claim Chart; Exhibit A11-Airmar P48; Feb. 12, 2014; 70 pages.
Invalidity Contention; U.S. Pat. No. 8,305,840 Invalidity Claim Chart; Exhibit A12-Russell-Cargill et al; Feb. 12, 2014; 89 pages.
Invalidity Contention; U.S. Pat. No. 8,305,840 Invalidity Claim Chart; Exhibit A13-Kongsberg EA 400/600; Feb. 12; 2014; 57 pages.
Invalidity Contention; U.S. Pat. No. 8,305,840 Invalidity Claim Chart; Exhibit A14-Sato; Feb. 12, 2014; 6 pages.
Invalidity Contention; U.S. Pat. No. 8,305,840 Invalidity Claim Chart; Exhibit A15-Chiang, E-Series; Feb. 12, 2014; 5 pages.
Invalidity Contention; US. Pat. No. 8,305,840 Invalidity Claim Chart; Exhibit A16-Bird, Wilcox, Nishimori, Hamada, Blue, Fatemi-Boosheri, Boucher '798, Thompson, Betts, Zimmerman, p. 48, Tri-Beam, Imagenex, Odom Echoscan; Feb. 12, 2014; 40 pages.
Invalidity Contention; U.S. Pat. No. 8,305,840 Invalidity Claim Chart; Exhibit A17-Hydrography, Humminbird 997c, Betts; Feb. 12, 2014; 69 pages.
Invalidity Contention; U.S. Pat. No. 8,305,840 Invalidity Claim Chart; Exhibit A18-Humminbird 997c; Feb. 12, 2014; 83 pages.
Invalidity Contention; U.S. Pat. No. 8,305,840 Invalidity Claim Chart; Exhibit A19-Betts; Feb. 12, 2014; 49 pages.
Jonsson, J., et al., "Simulation and Evaluation of Small High-Frequency Side-Scan Sonars using COMSOL"; Excerpt from the Proceedings of the COMSOL Conference; 2009; Milan, Italy.
Judgment of Inter Partes Review of U.S. Pat. No. 8,305,840; IPR2013-00355; dated Mar. 25, 2014; United States Patent and Trademark Office; 3 pages.
Judgment of Inter Partes Review of U.S. Pat. No. 8,305,840; IPR2013-00496; dated Mar. 25, 2014; United States Patent and Trademark Office; 3 pages.
Judgment of Inter Partes Review of U.S. Pat. No. 8,305,840; IPR2013-00497; Mar. 25, 2014; United States Patent and Trademark Office; 3 pages.
Kelly, D., The Scoop on Scanning Sonar, Motor Boating and Sailing, pp. 51, 70-71 (Aug. 1976).
Kelvin Hughes Transit Sonar; ". . . a new dimension in shallow water survey to assist in . . . "; Hydrography; Dredging; Salvage; Underwater Construction and Similar Works; Mar. 1966; 8 pages.
Key, W.H.; "Side Scan Sonar Technology"; Oceans 2000 MTS/IEEE Conference and Exhibition; vol. 2; Sep. 2000; pp. 1029-1033.
Kielczynski, P., et al.; "Finite Element Method (FEM) and Impulse Response Method (IRM) analysis of circular and rectangular transducers"; 1995 IEEE Ultrasonics Symposium; 1995; pp. 693-696.
Klein Associates, Inc.; 1985, "Side Scan Sonar Training Manual", Side Scan Sonar Record Interpretation; 151 pages.
Klein Associates Brochure: Hydroscan for Pipeline Survey (date unknown).
Klein Associates Brochure: Klein Smartfish, a Proven Platform for Deep Tow Applications (date unknown).
Klein Associates Brochure: System 3900-Dual-Frequency Side Scan Sonar for Search and Recovery (Nov. 2008).
Klein Associates Product Catalog Supplement: Sub-Bottom Profiler & Microprofiler (Supplement to Hydroscan catalog) (Nov. 1983).
Klein Associates, Inc., Klein Hydroscan System, 1983; 52 pages.
Klein Associates, Inc.; Modular Side Scan Sonar and Sub-Bottom Profiler System Components for Customized Configurations; date unknown; 10 pages.
Klein Digital Sonar Systems, ". . . The Next Generation From the World Leader in Side Scan Sonar and Sub-bottom Profiling Systems," 1988; 11 pages.

(56) References Cited

OTHER PUBLICATIONS

Klein Hydroscan Applications Bulletin: Oil and Gas Pipeline Routing, Laying and Inspection, (Jan. 1983).
Klein, M. et al., Sonar-a modem technique for ocean exploitation; IEEE Spectrum; Jun. 1968; pp. 40-46 and Authors page.
Klein, Martin; New Capabilities of Side Scan Sonar Systems; date unknown; pp. 142-147.
Klein, Martin; New Developments in Side Scan Sonar for Hydrography; date unknown; 14 page.
Klein, Martin; Sea Floor Investigations Using Hybrid Analog/Digital Side Scan Sonar; date unknown; 18 pages.
Klein, Martin; Side Scan Sonar; Offshore Services; Apr. 1977, pp. 67, 68, 71, 72, 75.
Klein, Martin; Side Scan Sonar; UnderSea Technology; Apr. 1967; 4 pages.
Kongsberg Brochure EA 400 Survey; "A complete, integrated survey system"; Kongsberg Maritime AS; Oct. 2003; 4 pages.
Kongsberg Brochure EA 400/600 "Sidescan Echo sounder with combined sidescan and depth soundings"; Kongsberg Maritime AS; May 2004; 3 pages.
Kongsberg Maritime AS; Side Looking Transducer, 200 kHz-0.5x49, 200 kHz side looking transducer for shallow water and surveying and high resolution; date unknown; 2 pages.
Kongsberg Publication; Pohner, Freddy et al.; Integrating imagery from hull mounted sidescan sonars with multibeam bathymetry: 16 pages.
Kongsberg Simrad AS; ConCat Containerised Catamaran, Inshore hydrographic survey vessel that fits in a container, Rev. B, Apr. 2004; 4 pages.
Kozak, G.; "Side Scan Sonar Target Comparative Techniques for Port Security and MCM Q-Route Requirements"; L-3 Communications; Klein Associates, Inc.; [Online]; Retrieved from the Internet URL: <http://www.chesapeaketech.com/techniques-port-security.pdf>; 11 pages.
Krotser, D.J., et al.; "Side-Scan Sonar: Selective Textural Enhancement"; Oceans'76; Washington, DC; Sep. 1976.
Kucharski, William M., and Clausner, James E., Underwater Inspection of Coastal Structures Using Commercially Available Sonars, Technical Report REMR-CO-11, US Army Corps of Engineers, Department of the Army (Feb. 1990).
Kurie, F.N.D. Design and Construction of Crystal Transducers, Office of Scientific Research and Development Washington D C., (1946).
Kvitek, R.G., et al.; "Victoria Land Latitudinal Gradient Project: Benthic Marine Habitat Characterization"; California State University; Monterey Bay; Field Report; Feb. 25, 2004.
Kvitek, Rikk et al.; Final Report, Early Implementation of Nearshore Ecosystem Database Project Tasks 2 and 3; <http://seafloor.csumb.edu/taskforce/html%202%20web/finalreport.htm>; Jul. 29, 1999; 92 pages.
L-3 Communications SeaBeam Instruments Technical Reference: Multibeam Sonar Theory of Operation, (2000).
Langeraar, W.; "Surveying and Charting of the Seas"; Elsevier Oceanography Series; vol. 37; Sep. 1983; p. 321.
Law, G., Sideways Glance, Side- and down-scan Imaging Open New Windows in Fishing Finding, Electronics, Nov. 2011, pp. 28-29.
Layton, J., Strickland, J., Bryant, C.W., How Google Earth Works, HowStuffWorks, Mar. 25, 2010, 2 pages; [Online]; Retrieved from Internet URL: http://wayback.archive.org/web/20100425042606/http://computer.howstuffworks.com/internet/basics/google-earth7.htm.
Leonard, John L.; Cooperative Autonomous Mobile Robots; date unknown; 11 pages.
Loeser, Harrison T., Sonar Engineering Handbook, Peninsula Publishing (1992).
Lowrance Electronics, Inc.; X-70A 3D Installation and Operation Instructions; 44 pages.
Lowrance HS-3DWN Transducer Assembly and Housing (Eagle IIID); Aug. 1994; 6 pages.

Lowrance LCX-18C & LCX-19C Fish-finding Sonar & Mapping GPS; Operation Instructions; © 2002; 200 pages.
Lowrance Transducers Product Information; 1 page.
Lowrance Trolling Motor Bracket Adapter for Skimmer Transducer; https://www.dickssportinggoods.com/p/lowrance-trolling-motor-bracket-adapter-for-skimmer-transducer-15lowutrllngmtbrfel/15lowutrllngmtbrfel?; retrieved Apr. 6, 2018; date unknown—at least as early as Sep. 11, 2017; 2 pages.
Manley, J.E., et al.; "Development of the Autonomous Surface Craft 'Aces'"; Oceans '97 MTS/IEEE Conference Proceedings; Oct. 1997; pp. 827-832.
Manley, J.E., et al.; "Evolution of the Autonmous Surface Craft 'AutoCat'"; Oceans 2000 MTS/IEEE Conference and Exhibition; vol. 1; Sep. 2000; pp. 403-408.
Marine Acoustics Society of Japan, Ed.; "Basics and Application of Marine Acoustics"; Apr. 28, 2004; pp. 152-172.
Marine Sonic Technology, Ltd.; Sea Scan® PC Side Scan Sonar System Information/Specifications Sheet; Sep. 9, 2002; 10 pages.
Maritime surveys takes delivery of SeaBat 8160; Sea Technology, Jul. 2001; <http://findarticles.com/p/articles/mi-qa5367/is-2001007/ai-n21475675/>; website printed Jun. 30, 2010.
Mazel C. H., 1984 "Inspection of Surfaces by Side-Scan Sonar," ROV '84 Remotely Operated Vehicle Conference of the Marine Technology Society, 7 pages.
Mazel, Charles H., Inspection of Sufaces by Side Scan Sonar, Proceedings of the Remotely Operated Vehicles Conference and Exposition, (1984).
McMillan, Ken, the Application of Sector Scanning Sonar Technology to the Mapping of Granular Resources on the Beaufort Shelf using the Sea-Ice as a Survey Platform, McQuest Marine Research and Development Company, Report Prepared Geological Survey of Canada Atlantic, (Mar. 1997).
Medwin, H. et al., Fundamentals of Acoustical Oceanography, Academic Press (1998).
Melvin, G., et al.; Commercial fishing vessels, automatic acoustic logging systems and 3D data visualization; ICES; Journal of Marine Science; vol. 59; Issue 1; 2002; pp. 179-189.
Mesotech; Mesotech Model 971 Sonar System Summary; Mar. 26, 1985, 2 pages.
Miller, S.P., Selected Readings in Bathymetric Swath Mapping, Multibeam Sonar System Design, University of California Santa Barbara (Apr. 1993).
Montgomery, E.T., et al., "Documentation of the U.S. Geological Survey Oceanographic Time-Series Measurement Database", USGS Open-File Report 2007-1194; 2 pages.
Morang, Andrew, Kucharski, William M., Side-Scan Investigation of Breakwaters at Calumet and Burns Harbors in Southern Lake Michigan, Oceans 86 Conference Record, pp. 458-465, Sep. 1986.
Naoi, J., et al.; "Sea Trial Results of a Cross Fan Beam Type Sub-Bottom Profiler;" Japanese Journal of Applied Physics, vol. 39, No. 5; dated May 2000.
Navico Design Report of Raytheon Electronics Side Looker Transducer; Mar. 12, 2010; 18 pages.
Newman, P., Durrant-Whyte, H., Using Sonar in Terrain-Aided Underwater Navigation, IEEE Proceedings, (May 1998).
Newman, P.M.; "MOOS-Mission Orientated Operating Suite"; Department of Ocean Engineering; Massachusetts Institute of Technology; 2002.
NOAA: Nautical Charting general information from public records; [Online]; Retrieved on Sep. 10, 2010 from the Internet URL: <http://www.nauticalcharts.noaa.gov/csdl/learn-hydroequip.html>; 2 pages; <http://www.nauticalcharts.noaa.gov/csdl/learn-hydroequip.html>; 1 page; <http://www.nauticalcharts.noaa.gov/csdl/PDBS.html>; 2 pages; <http://www.nauticalcharts.noaa.gov/hsd/pub.html>; 1 page; <http://www.nauticalcharts.noaa.gov/hsd/fpm/fpm.htm>; 1 page; <http://www.ozcoasts.gov.au/geom-geol/toolkit/Tech-CA-sss.jsp>; 12 pages.
Noble, N., The Telltale Sound of Depth, Motor Boathing and Sailing, pp. 23-24(Aug. 1976).
Oceanic Imaging Consultants (OIC) Inc.: GeoDAS SDV Geophysical Data Acquisition System Brochure.
Odom Echoscan™; For Sea Floor or Riverbed Surveys; Odom Hydrographic Systems; Apr. 26, 2002; 2 pages.

(56) References Cited

OTHER PUBLICATIONS

Odom Hydrographic Systems Echoscan Manual; Revision 1.11; Apr. 26, 2002.
Office Action for European Application No. 10728530.6; dated Apr. 2, 2013.
Office Action for European Application No. 10729001.7; dated Apr. 5, 2013.
Office Action for Japanese Application No. 2012-267270 dated Dec. 2, 2013.
Office Action for Japanese Application No. 2013-037874 dated Mar. 26, 2014.
Office Action for Reexamination No. 90/009,956; dated Apr. 6, 2012; 32 pages.
Office Action for Reexamination No. 90/009,957; dated Jun. 4, 2012; 17 pages.
Office Action for Reexamination No. 90/009,958; dated Jun. 18, 2012; 19 pages.
Office Action for U.S. Appl. No. 11/195,107; dated Aug. 9, 2007; 7 pages.
Office Action for U.S. Appl. No. 11/195,107; dated Feb. 15, 2007; 5 pages.
Office Action for U.S. Appl. No. 11/195,107; dated Jul. 17, 2008; 7 pages.
Office Action for U.S. Appl. No. 11/195,107; dated Mar. 4, 2008; 7 pages.
Office Action for U.S. Appl. No. 11/195,107; dated May 12, 2009; 9 pages.
Office Action for U.S. Appl. No. 12/319,586; dated Mar. 2, 2010; 5 pages.
Office Action for U.S. Appl. No. 12/319,586; dated Sep. 3, 2009; 5 pages.
Office Action for U.S. Appl. No. 12/319,594; dated Jun. 8, 2009; 10 pages.
Office Action for U.S. Appl. No. 12/319,604; dated Sep. 29, 2009; 7 pages.
Office Action for U.S. Appl. No. 12/631,229; dated Sep. 9, 2010; 8 pages.
Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.
Onoe, M., and Tiersten, H.F., Resonant Frequencies of Finite Piezoelectric High Ceramic Vibrators with High Electromechanical Coupling, IEEE Transactions of Ultrasonics Engineering, pp. 32-39 (Jul. 1963).
ONR Grant N66604-05-1-2983; Final Report; "Cooperative Autonomous Mobile Robots"; Retrieved from the Internet URL: <http://dodreports.com/pdf/ada463215.pdf>; Post 2006.
Oughterson, B., Sophisticated Sonar Reveals Detailed Images Recently Unimaginable. Is it Too Much too Soon?, Basic Instincts, pp. 75-78.
Owner's Guide & Installation Instructions, Transam or Tolling Motor Mount, Chirp or Adjustable Wide-beam Transducer, Models: P48W, TM130M, TM150M, TM210H (2013).
Pappalardo, M., Directivity Pattern of a Linear Array Transducer in High Frequency Range, Journal de Physique, pp. 32-34 (Nov. 1972).
Patent Owner's Preliminary Response; Inter Partes Review of U.S. Pat. No. 8,305,840; dated Sep. 17, 2014; Navico Holding AS; 102 pages.
Patent Owner's Preliminary Response; Inter Partes Review of U.S. Pat. No. 8,305,840; IPR2013-00355; dated Sep. 17, 2014; Navico Holding AS; 102 pages.
Patent Owner's Preliminary Response; Inter Partes Review of U.S. Pat. No. 8,305,840; IPR2013-00496 ; dated Sep. 17, 2014; Navico Holding AS; 114 pages.
Patterson, D.R., and J. Pope, Coastal Applications of Side Scan Sonar, Proceedings of Coastal Structures '83, Mar. 1983.
PCT International Search Report and Written Opinion; PCT/IB2013/060285; dated Feb. 18, 2014.
PCT International Search Report and Written Opinion; PCT/US2013/047645; dated Sep. 27, 2013.
PCT International Search Report and Written Opinion; PCT/US2013/047926; dated Oct. 21, 2013.
PCT International Search Report and Written Opinion; PCT/US2013/047869; dated Oct. 11, 2013.
PCT International Search Report and Written Opinion; PCT/US2013/048129; dated Oct. 17, 2013.
PCT International Search Report and Written Opinion; PCT/US2013/048177; dated Oct. 21, 2013.
Petition for Inter Partes Review of U.S. Pat. No. 8,305,840; IPR2013-00355; dated Jun. 13, 2013; Raymarine, Inc.; 63 pages.
Petition for Inter Partes Review of U.S. Pat. No. 8,305,840; IPR2013-00496; dated Aug. 6, 2013; Raymarine, Inc.; 63 pages.
Petition for Inter Partes Review of U.S. Pat. No. IPR2013-00497; dated Aug. 6, 2013; Raymarine, Inc.; 64 pages.
Plueddemann, A. J., et al.; "Design and Performance of a Self-Contained Fan-Beam ADCP;" IEEE Journal of Oceanic Engineering, vol. 26, No. 2; dated Apr. 2001.
Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.
Prickett, T.; "Underwater Inspection of Coastal Structures"; The REMR Bulletin; vol. 14; No. 2; Aug. 1997.
Product News, Versatile Side-Scan Sonar: JW Fishers developed a side-scan towfish with adjustable transducers, Hydro International, (Feb. 2008) http://.hydro-international.com/news/id2531-VersatileSidescanSonar.html.
Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.
QPS b.v.,: Qinsy User Manual (Apr. 27, 2004).
R/V Quicksilver; Hydrographic Survey Launch Bareboat or Crewed; F/V Norwind, Inc.
R/V Tangaroa; Fact Sheet; Explore lost worlds of the deep; Norfanz Voyage; May 10 to Jun. 8, 2003.
Raymarine, L750 Fishfinder, Operation Handbook; date unknown; 93 pages.
Raymarine: A65 GPS Chartplotter Owners Handbook; © Raymarine 2006; 100 pages.
Raymarine: DSM25 Digital Sounder Module Owner's Handbook; 62 pages.
Raymarine: E-series Networked Display: Reference Manual; Mar. 2006; 51 pages.
Raymarine: CPT-DV(S) Hull / Step / Trolling Motor Bracket; Mar. 2015; 2 pages.
Raytheon Marine Company; Installation Instructions; Oct. 1998; 2 pages.
Remtechsroy Group; Side Scan Sonar-Remotely Operated Vehicle Surface; <http://remtechnology.en.ec21.com/Side-Scan-Sonar-Remotely-Operated-2902034-2902230.html>; printed on Feb. 12, 2010; 4 pages.
RESON Inc.; SeaBat 8101 Product Specification, 240kHz Multibeam Echo Sounder; © 1999; 2 pages.
RESON; SeaBat 8101; Multibeam acoustic echosounder; date unknown; 1 page.
RESON; SeaBat 8160 Product Specification, Multibeam Echosounder System; date unknown; 2 pages.
Response to European Search Report for European Patent Application No. 05782717.2-2220; dated Mar. 23, 2012; Johnson Outdoors, Inc.; 35 pages.
Riordan, J., et al.; "Implementation and Application of a Real-time Sidescan Sonar Simulator;" Oceans 2005-Europe, vol. 2; dated Jun. 2005.
Ronhovde, A., High Resolution Beamforming of Simrad EM3000 Bathymetric Multibeam Sonar Data, Cand Scient thesis, University of Oslo, Norway. (Oct. 1999).
Rossing, Thomas D., Sonofusion??, Echoes: the Newsletter of the Acoustical Society of America, vol. 12, No. 2 (Spring. 2002).
Rusby, Stuart, A Long Range Side-Scan Sonar for Use in the Deep Sea (Gloria Project) Int. Hydrogr. Rev., pp. 25-39 (1970).

(56) References Cited

OTHER PUBLICATIONS

Russell-Cargill, W.G.A. ed.; Recent Developments in Side Scan Sonar Techniques; © 1982; 141 pages.
SeaBat 8101 Product Specification; 240kHz Multibeam Echo Sounder; © 1999 RESON Inc.; Version 4.0; 6 pages.
Search Report for European Application No. 12195752.6; dated Mar. 7, 2013.
Sherman, C. & J. Butler, Transducers and Arrays for Underwater Sound, Springer Sci. & Bus. Media, 1st ed. (2007).
Shono, K., et al.; "Integrated Hydro-Acoustic Survey Scheme for Mapping of Sea Bottom Ecology"; Ocean Research Institute; Tokyo, Japan; Nov. 2004.
Side Scan PC Operation Manual: SSS-100K PC, SSS-600K PC, SSS-100K/600K PC Side Scan Sonar Operation and Maintenance Manual, JW Fishers MFG Inc (date unknown).
Sidefinder-Reviews & Brand Information—Techsonic Industries, Inc.; [Online]; [Retrieved on Dec. 7, 2011]; Retrieved from the Internet URL:<http://www.trademarkia.com/sidefinder-74113182.html>; 3 pages.
Simrad EA 500; Hydrographic Echo Sounder; Product Specifications; Revision: Sep. 1993.
Simrad EK 500 Fishery Research Echo Sounder Installation Manual (Jun. 2006).
Simrad EK 500 Fishery Research Echo Sounder Operator Manual (May 1996).
Simrad Kongsberg EM Series Multibeam Echo Sounder Operators Manual (2000).
Simrad; Product Specifications, Simrad EA 500 Side-looking Option; Feb. 1992, 1 page.
SOLAS Chapter V; Safety of Navigation, Jul. 1, 2002; [Online]; Retrieved from the Internet URL:https://www.gov.uk/government/uploads/system/uploads/attachment-data/file/343175/solas-v-on-safety-of-navigation.pdf.
Somers, M.L., and Stubbs, A.R., Sidescan Sonar, IEE Proceedings, pp. 243-256, Jun. 1984.
Sonar Theory and Applications; Excerpt from Imagenex Model 855 Color Imaging Sonar User's Manual; Imagenex Technology Corp.; Canada; 8 pages.
SonarBeam Underwater Surveying System Using T-150P tow-fish hull mounted; [Online]; Retrieved on Feb. 12, 2010 from the Internet URL: <http://dsmeu.en.ec21.com/Remotely-Operated-Sonar-Boat-System--618904-2479905.html>; 4 pages; <http://www.remtechnology.en.ec21.com/Side-Scan-Sonar-Remotely-Operated-2902034.html>; 4 pages; Retrieved on Feb. 16, 2010 from the Internet URL: <http://dsmeu.en.ec21.com/Remotely-Operated-Sonar-Boat-System--618904-2479905.html>; 4 pages; <http://www.remtechnology.en.ec21.com/Side-Scan-Sonar-Remotely-Operated-2902230.html>; 7 pages.
Sosin, M., Can Electronics Make You Almost as Smart as a Fish, Popular Mechanics, pp. 110-111 (Nov. 1976).
Speiss, F.N., and Tyce, R.C., Marine Physical Laboratory Deep Tow Instrumentation System, Deep Submergence Systems Project and Office of Naval Research, Report No. MPL-U-69/72, (Mar. 1973).
Spiess, F.N., Acoustic Imaging, Society of Photo-optical Instrumentation Engineers' Seminar-in-Depth on Underwater Photo-optical Instrumentation Applications, pp. 107-115 (Mar. 1971).
Stansfield, D., High Frequency Designs, Underwater Electroacoustic Transducers: A Handbook for Users and Designers, Bath University Press and Institute of Acoustics (1991).
Starfish 450H; Sidescan System; Tritech International Limited; Uk.
Streed, C.A., et al., AQS-20 Through-The-Sensor Environmental Data Sharing, Proceedings of the SPIE Defense & Security Symposium (Mar. 2005).
Stride, A.H., A Linear Pattern on the Sea Floor and its Interpretation, National Institute of Oceanography, Wormley, Surrey, pp. 313-318 (1959).
Supplemental Response to Interrogatories, Exhibit 1; International Trade Commission; dated Feb. 28, 2014; Navico Holding AS.; 114 pages.
Supplemental Response to Interrogatories, Exhibit 2; International Trade Commission; dated Feb. 28, 2014; Navico Holding AS.; 67pages.
Supplemental Response to second set of Interrogatories; International Trade Commission; Investigation No. 337-TA-898; dated Jan. 6, 2014; Raymarine, Inc.; 12 pages.
T297-00-01-01 Transducer housing outline drawing; Neptune Sonar Ltd.; © 2002.
Taylor, W.A., et al., Taking the Man out of the Minefield, Sea Technology 2007, vol. 48, No. 11, pp. 15-19 (Nov. 2007).
Techsonic Industries, Inc., Humminbird Wide fish wide open!; brochure, 1997; 4 pages.
Techsonic Industries, Inc.; "Element, 455 kHz"; Schematic, Jun. 13, 1996.
Techsonic Industries, Inc.; "Mask, Acoustic"; Schematic, May 24, 1996.
Techsonic Industries, Inc.; Humminbird GPS brochure; © 1992; 10 pages.
Teleflex Electronic Systems; Humminbird 1997; © 1996; 24 pages.
The Humminbird GPS Navigational System. Nothing Else Even Close.; Humminbird Marine Information Systems®; 1992; 10 pages.
The Hydrographic Society-Corporate Member News-Kongsberg Simrad; Jul. 3, 2008; 7 pages.
The Imagenex SportScan; Digital Sidescan Sonar; "Redefining Image Clarity"; Imagenex Technology Corp.; © 2002; 4 pages.
The Norwegian and Finnish navies performing operations with the Kongsberg Hugin AUV and minesniper mine disposal vehicle in Finnish waters; FFU nytt; No. 3, Nov. 2003; p. 12.
Tokuyama, H. et al., Principles and Applications of Izanagi Oceanfloor Imaging Sonar System, Journal of the Japan Society of Photogrammetry and Remote Sensing, vol. 29, No. 2, 1990, pp. 76-83.
Trabant, Peter K.; Applied High-Resolution Geophysical Methods, Offshore Geoengineering Hazards; © 1984; 265 pages.
Trademark Electronic Search System (TESS); Word Mark: Sidefinder; [Online]; [Retrieved on Dec. 7, 2011]; Retrieved from the Internet URL:<http://tess2.uspto.gov/bin/showfield?f=doc&state=4009:qi4jkj.2.1>; 2 pages.
Translation of Notice of Reason(s) for Rejection for Japanese Application No. 2007-524919 dated Aug. 16, 2011; 4 pages.
Trevorrow, M.V., et al.; "Description and Evaluation of a Four-Channel, Coherent 100-kHz Sidescan Sonar"; Defence R&D Canada-Atlantic; Dec. 2004.
Tritech International Limited; StarFish; 450H Hull-Mounted Sidescan System; date unknown; 2 pages.
Tritech Manual: Starfish Hull Mount Sonar System User Guide (date unknown).
Tritech Technical Data Sheet: ROV/AUV Side Scan-Sea King Side Scan Sonar (date unknown).
Triton Elics Intl.: ISIS Sonar® User's Manual, vols. 1 and 2 (Jun. 2004).
Tucker, M. J., and Stubbs, A. R., "Narrow-beam echo-ranger for fishery and geological investigations", British Journal of Applied Physics vol. 12:3 pp. 103-110 (1961).
Tyce, R.C., Deep Seafloor Mapping Systems A Review, Marine Tech. Soc. Journal., vol. 20, No. 4, pp. 4-16 (Dec. 1986).
Ultra III 3D Installation and Operation Instructions; Eagle™; © 1994.
Universal Sonar Limited; High Frequency Broad Band Line Array Type G27/300LQ; date unknown 2 pages.
Urick, R.J., Principles of Underwater Sound, 3rd Edition, McGraw-Hill Book Company, 1983.
USACE, "Chapter 11, Acoustic Multibeam Systems for Deep-Draft Survey Navigation Projects," Apr. 1, 2004.
U-Tech Company Newsletter.
Vaganay, J., et al.; "Experimental validation of the Moving Long Base-Line Navigation Concept"; 2004 IEEE/OES Autonomous Underwater Vehicles; Jun. 2004.
Vaneck, T.W., et al.; "Automated Bathymetry Using an Autonomous Surface Craft"; Journal of the Institute of Navigation; vol. 43; Issue 4; Winter 1996; pp. 329-334.
Various Imagenex Technical Specifications and User's Manual; Prior to Aug. 2003.

(56) References Cited

OTHER PUBLICATIONS

Vernitron Product Catalog: Modern Piezoelectric Ceramics, Custom Material Product Catalog (date unknown).
Waite, A.D.; "Sonar for Practising Engineers"; Third Edition; John Wiley & Sons, Ltd.; West Sussex, England; © 2002; 323 pages.
Wang, H.S.C., Amplitude Shading of Sonar Transducer Arrays, The Journal of the Acoustical Society of America, pp. 1076-1084, (May 1975).
Wesmar Brochure: Wesmar's New HD800 Sonar (date unknown).
Wesmar Sonar Effective in Shallow-Water Operations Literature Available, Maritime Reporter and Engineering News, p. 13 (Dec. 15, 1983).
Wesmar; 500SS Side Scan Brochure; May 1998; 2 pages.
Wesmar; 500SS Side Scan Owner's Manual; 82 pages.
Wesmar; 500SS Sidescan Brochure; Feb. 1985; 2 pages.
Wesmar; SHD 700SS Super High Definition Side Scan Sonar; date unknown; 4 pages.
Wesmar; SHD 700SS; "Super High Definition Side Scan Sonar with Color Video Display Capability", Operations Manual, May 1998, 45 pages.
Westinghouse Publication; "Side-Scan Sonar Swiftly Surveys Subsurface Shellfish"; May 1970; 4 pages.
Williams, J. P., Glancing Sideways, Nautical Know-How, Chesapeake Bay Magazine, May 2011, pp. 14-17.
Wiliams S. Jeffress, Use of High Resolutlon Seismic Reflection and Side-Scan Sonar Equipment for Offshore Surveys, CETA 82-5, U.S. Army Corps of Engineers Coastal Engineering Research Center (Nov. 1982).
Wilson, D., "Side Scan Sonar: The Key to Underwater Survey", Flinders Archaeology Blog, Oct. 25, 2011, 4 pages.
Wilson, O.B., An Introduction to the Theory and Design of Sonar Transducers, Navy Postgraduate School, Monterey, California (Jun. 1985).
Woollett, R.S., Sonar Transducer Fundamentals, Scientific and Engineering Studies, Naval Underwater Systems Center (1984).
Yamamoto F. et al., Oceanfloor Imaging System-Izanagi, Journal of the Japan Society for Marine Surveys and Technology 1 (2), Sep. 1989, pp. 45-51, 53 and 54.
Yang, L., et al.; "Bottom Detection for Multibeam Sonars with Active Contours;" MTSIEEE Conference Proceedings, vol. 2; dated Oct. 1997.

* cited by examiner

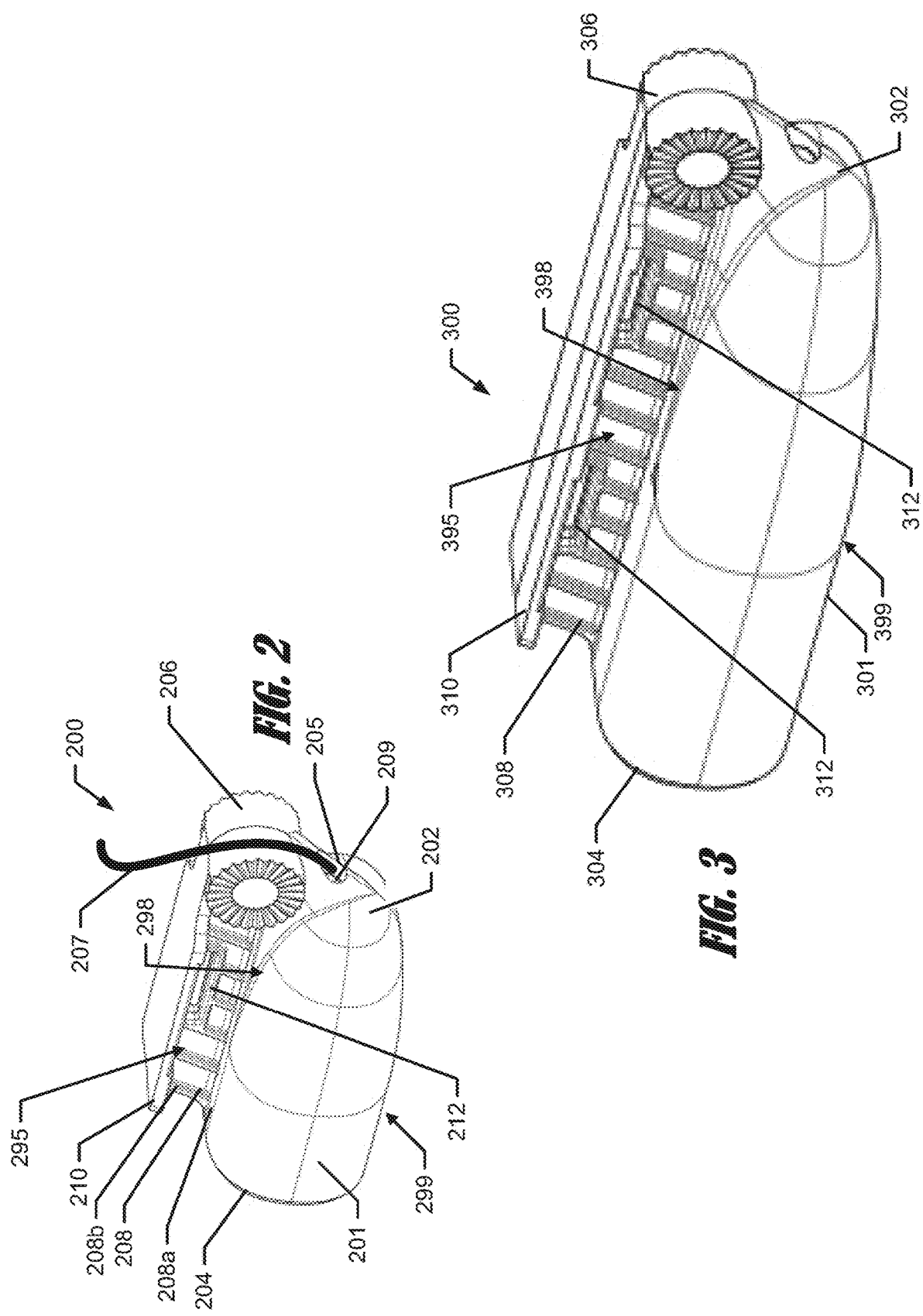

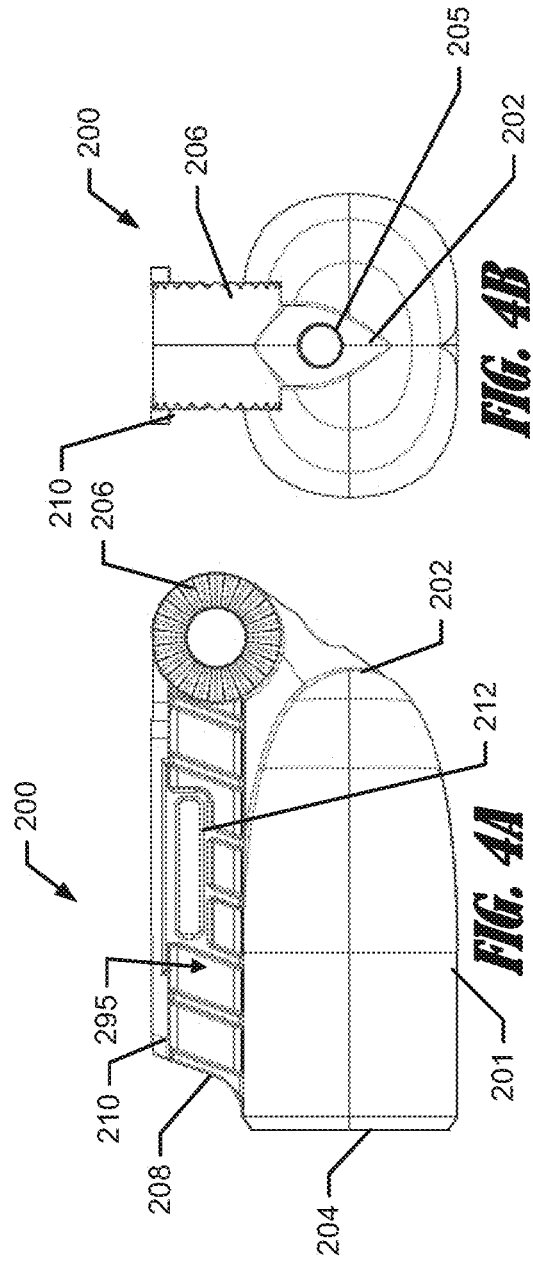
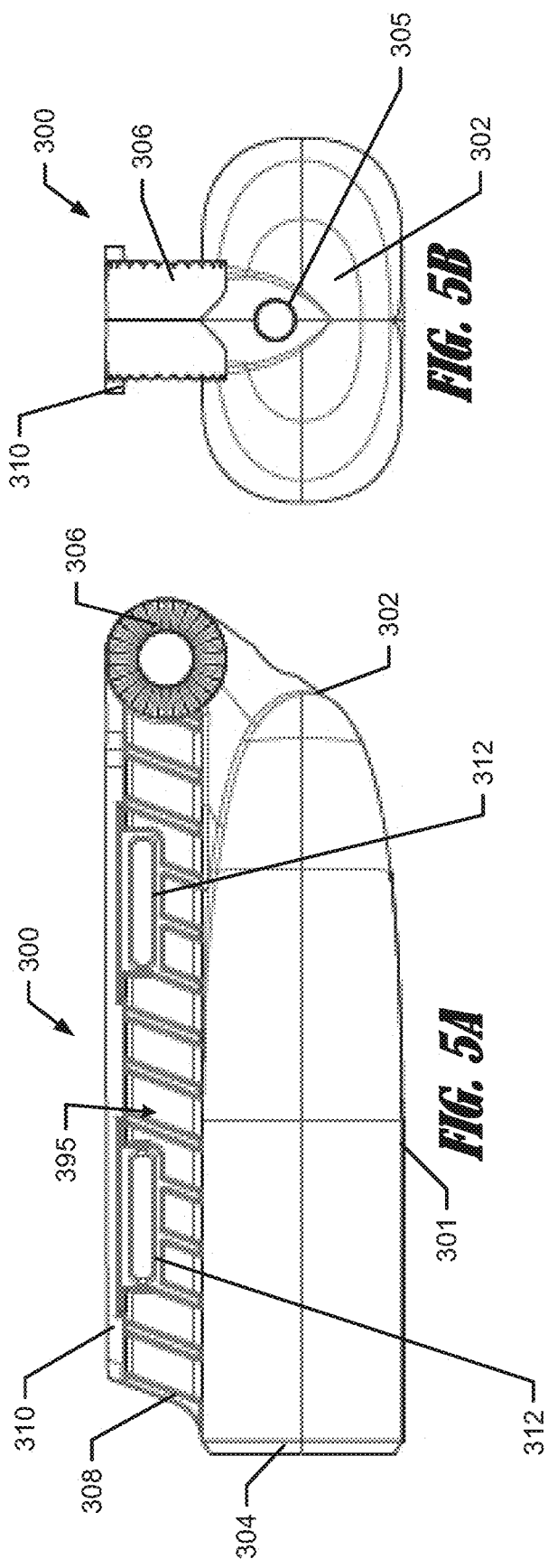

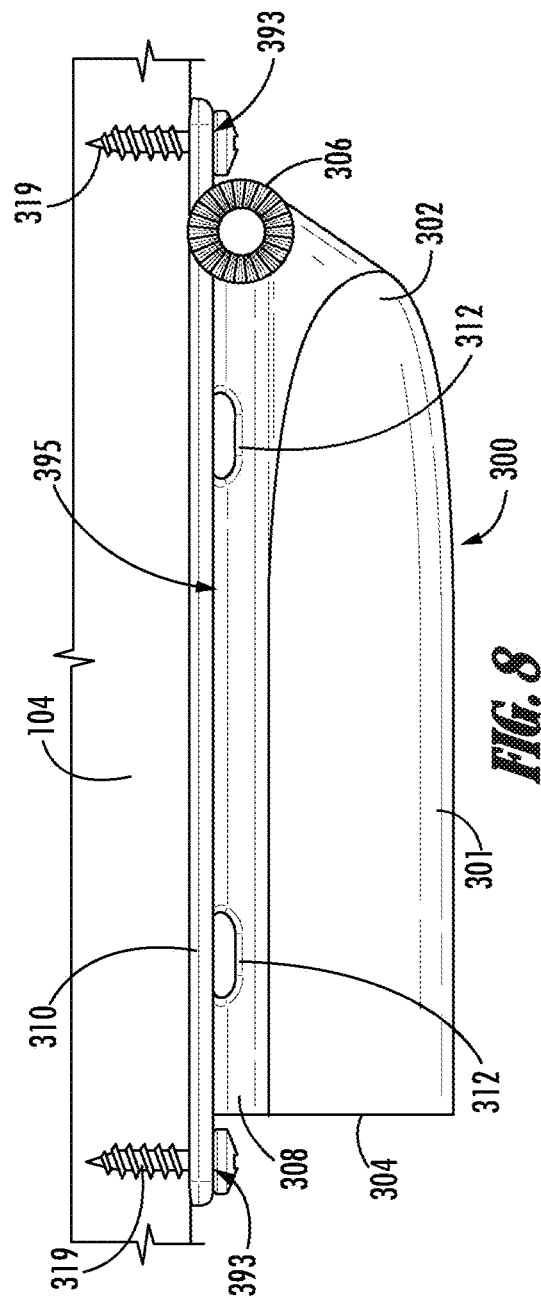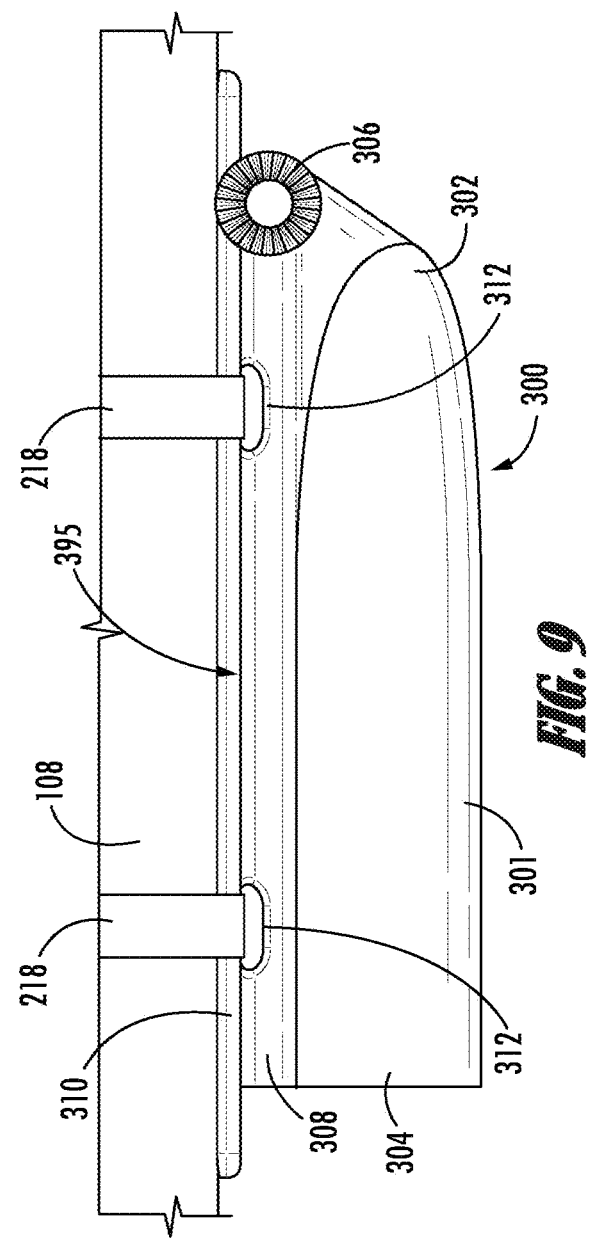

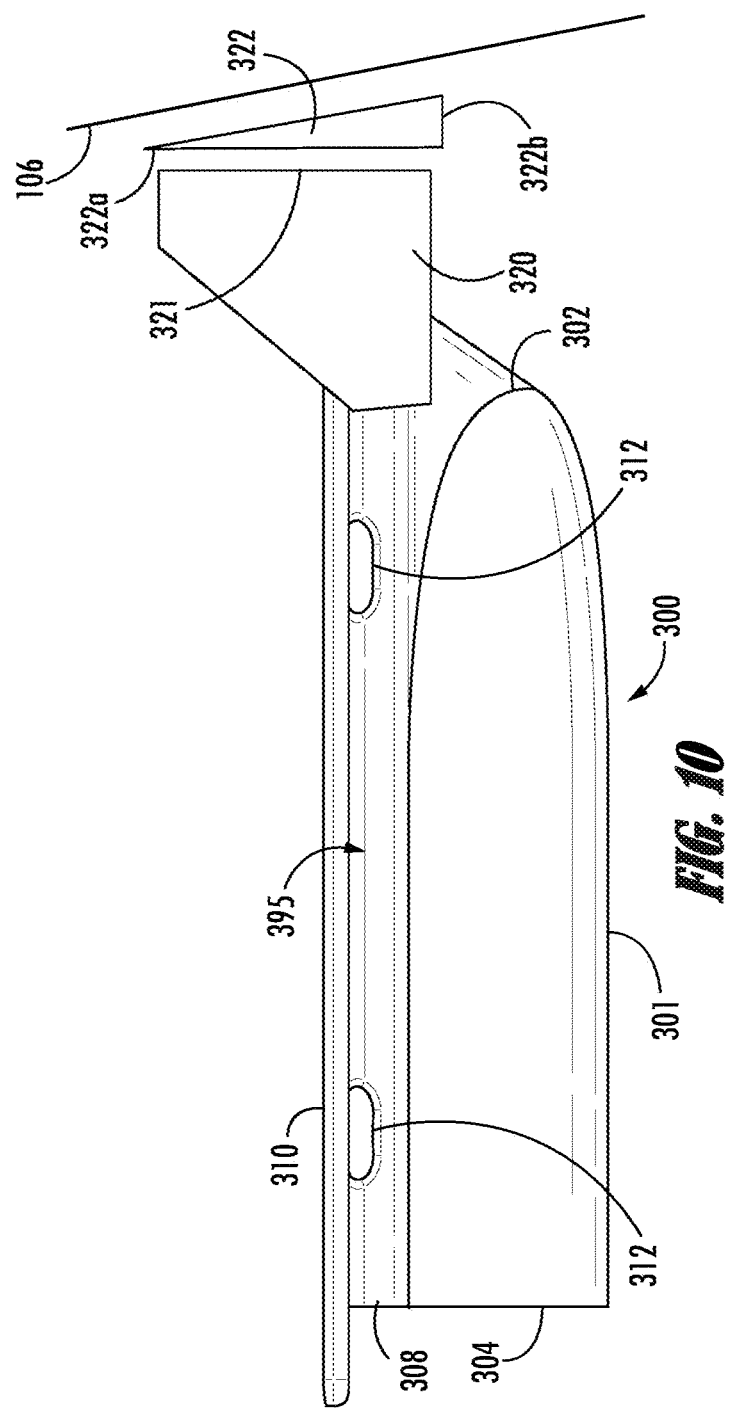

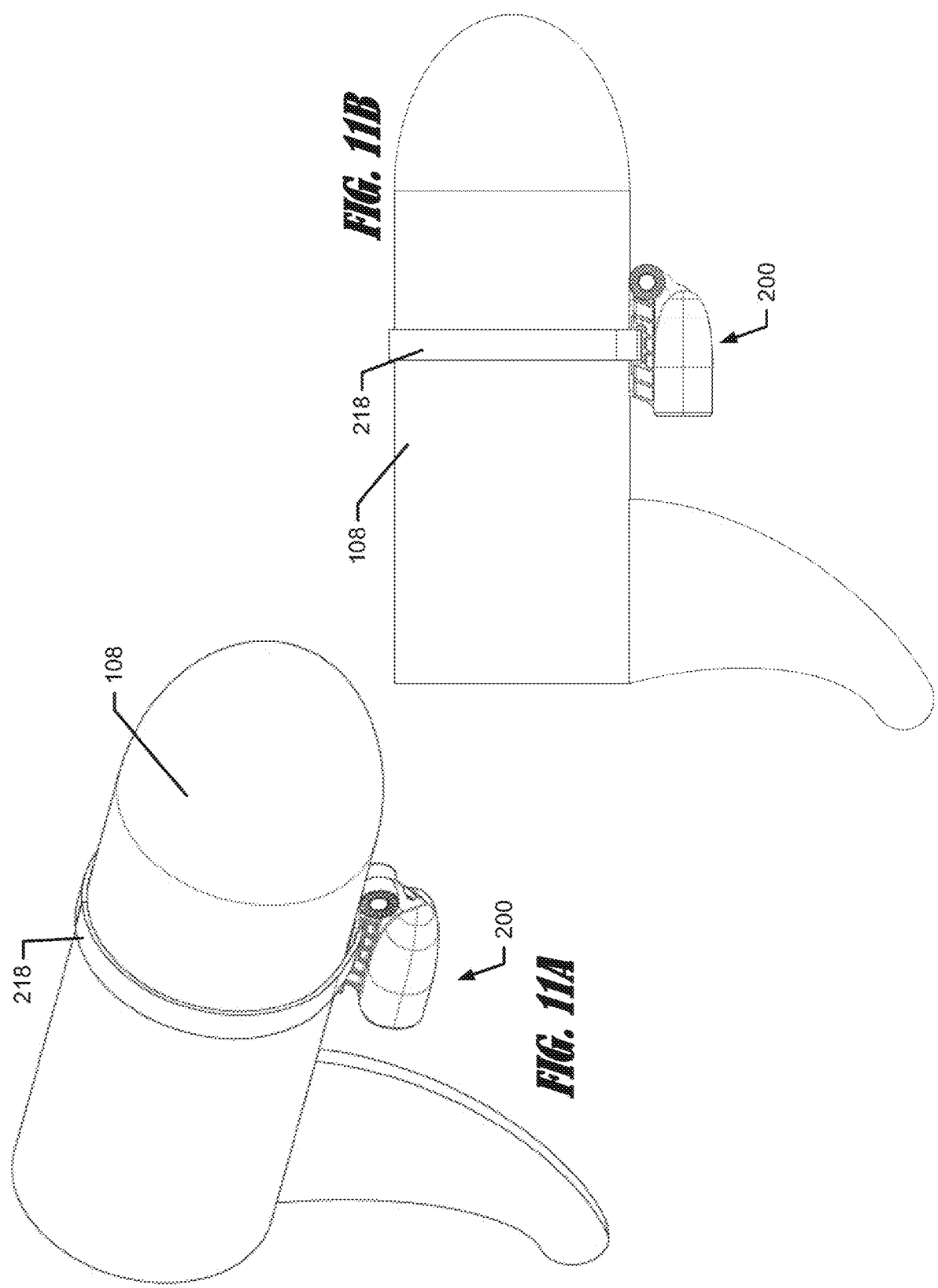

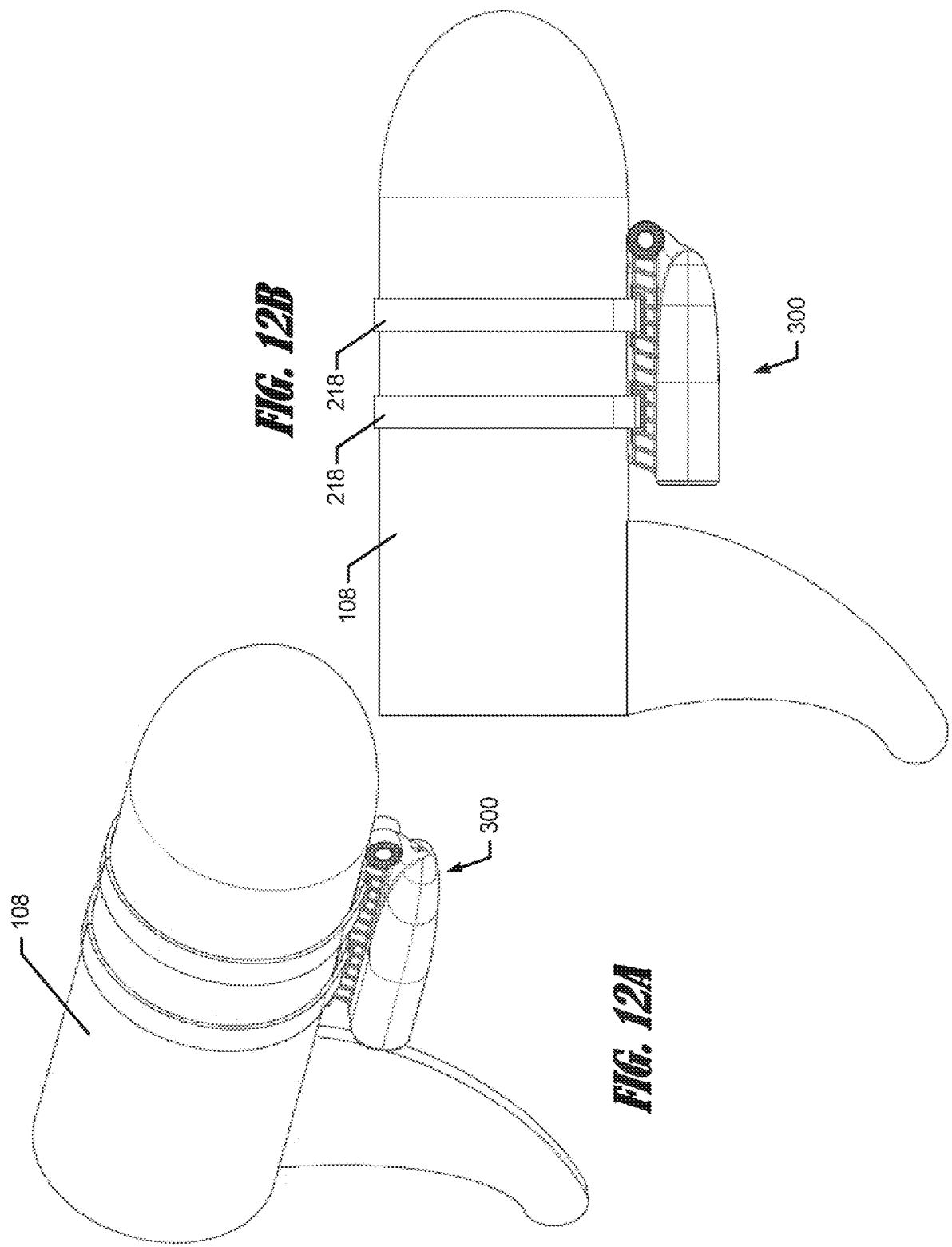

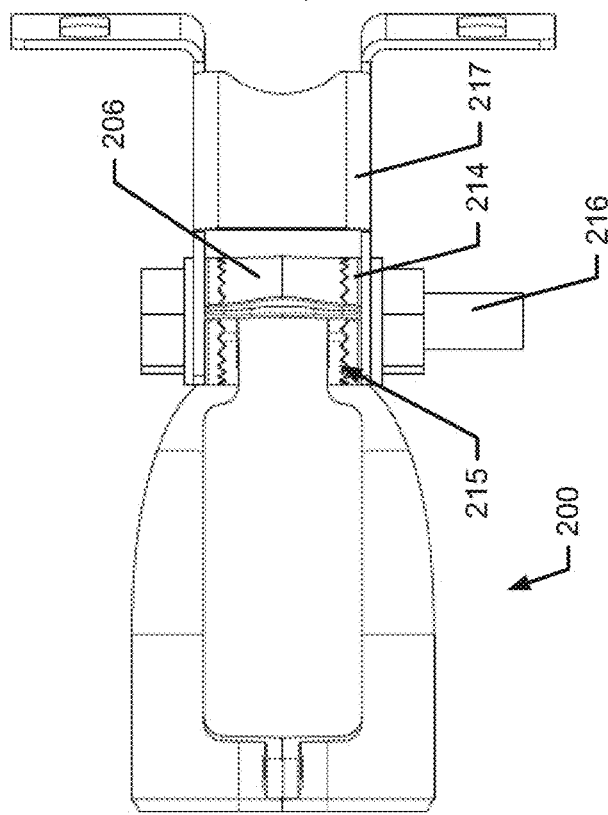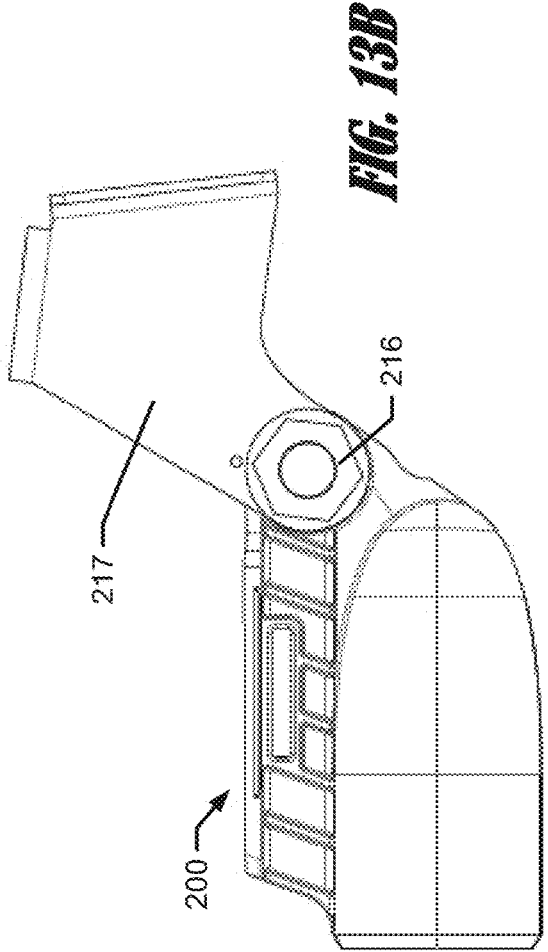

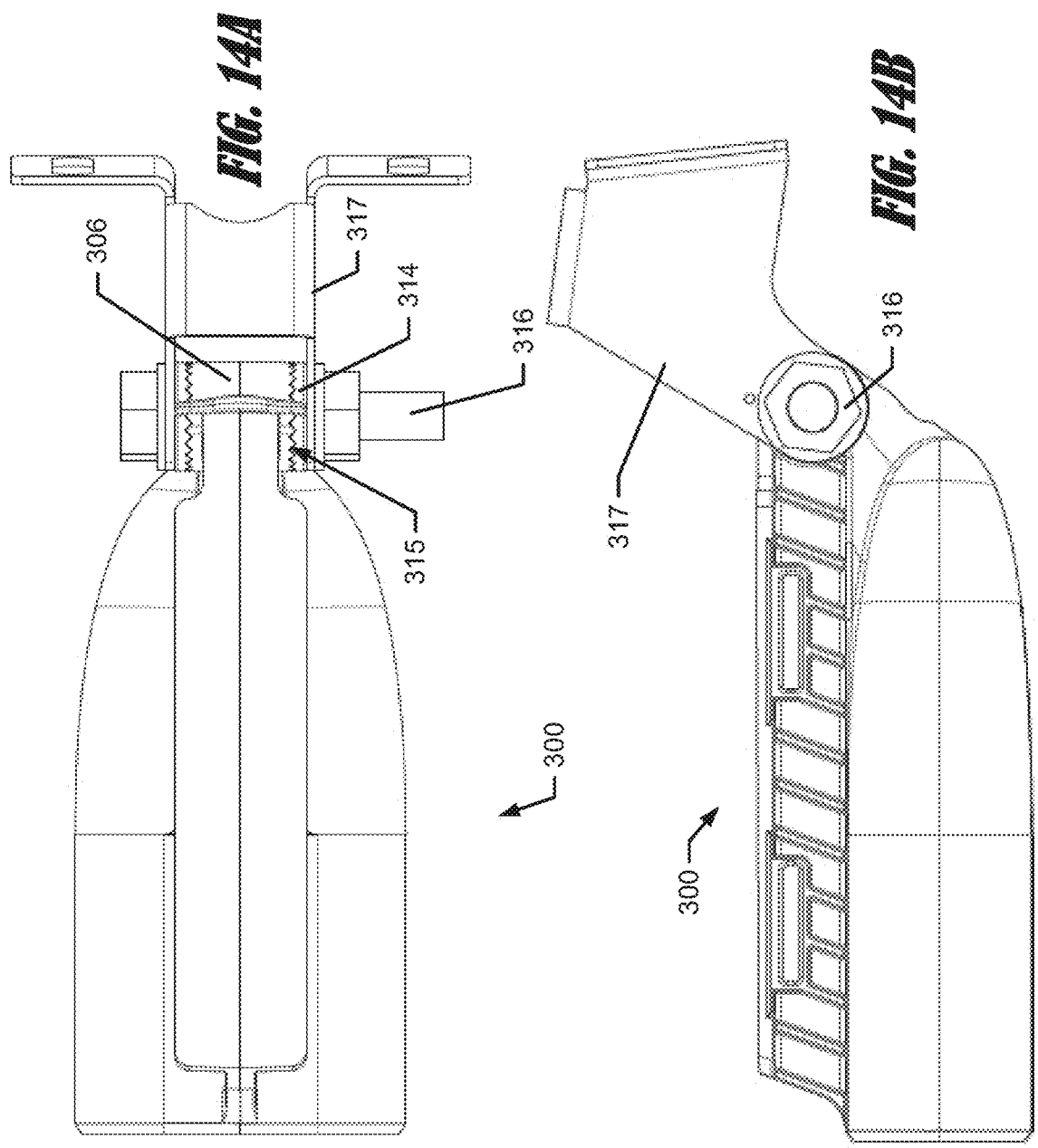

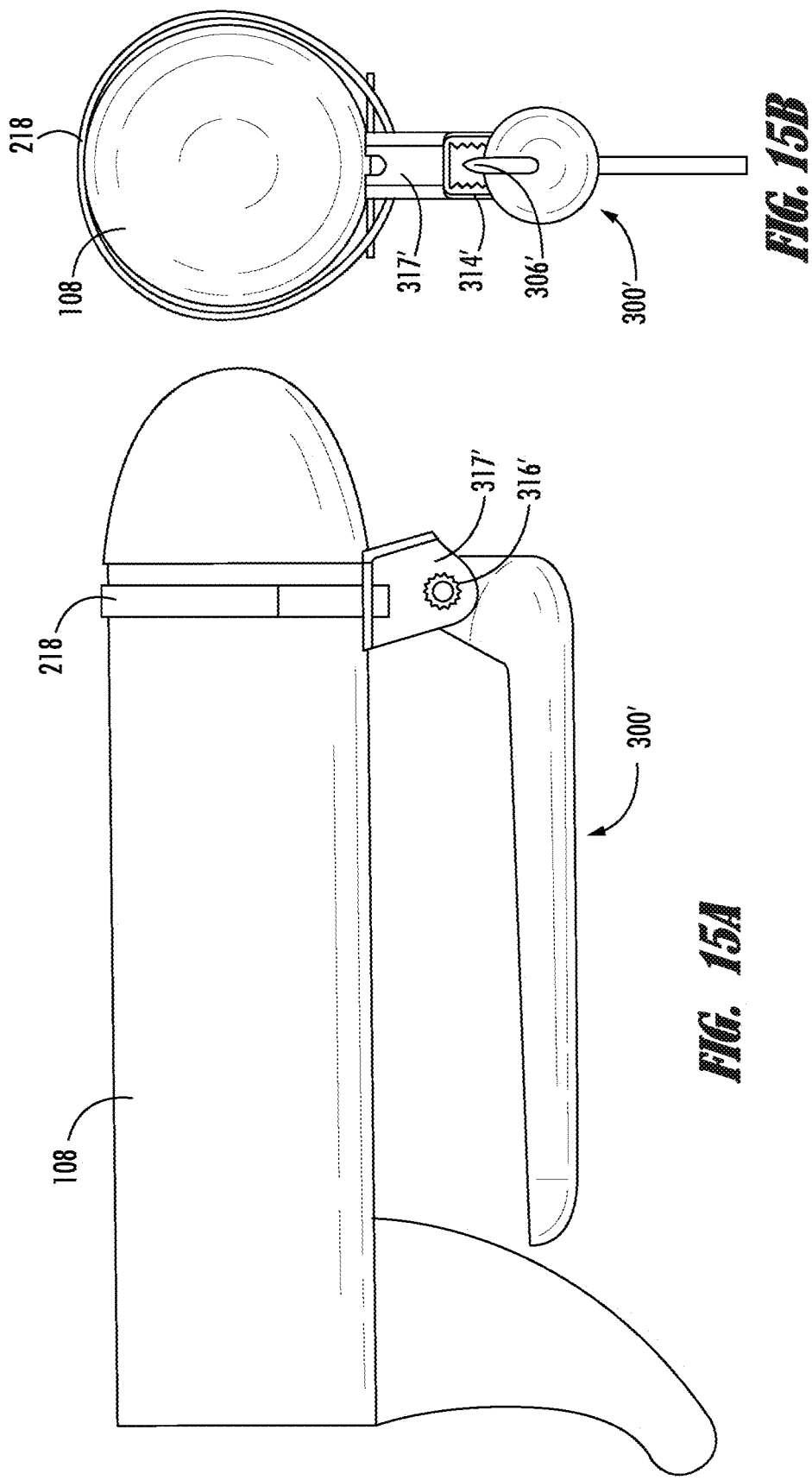

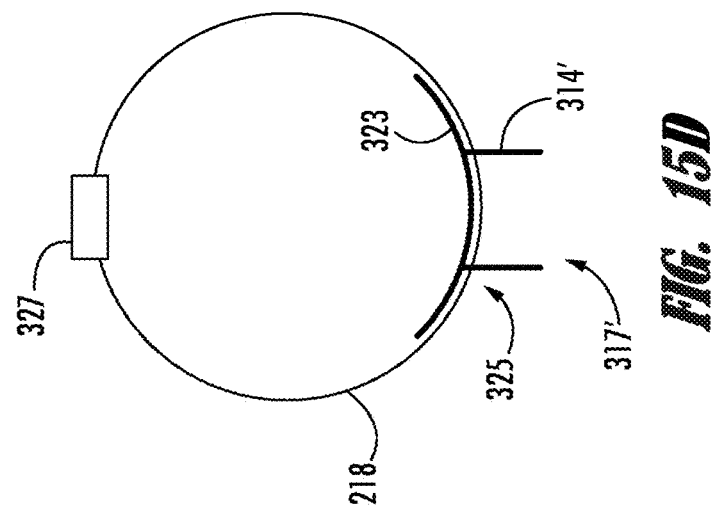
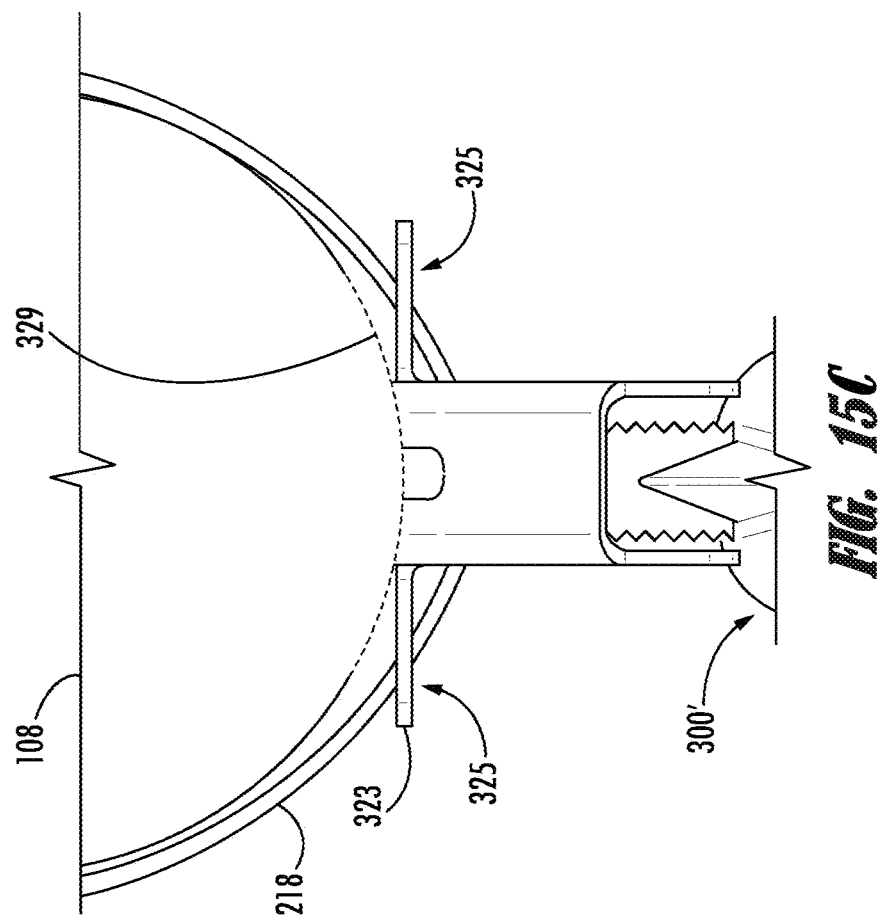

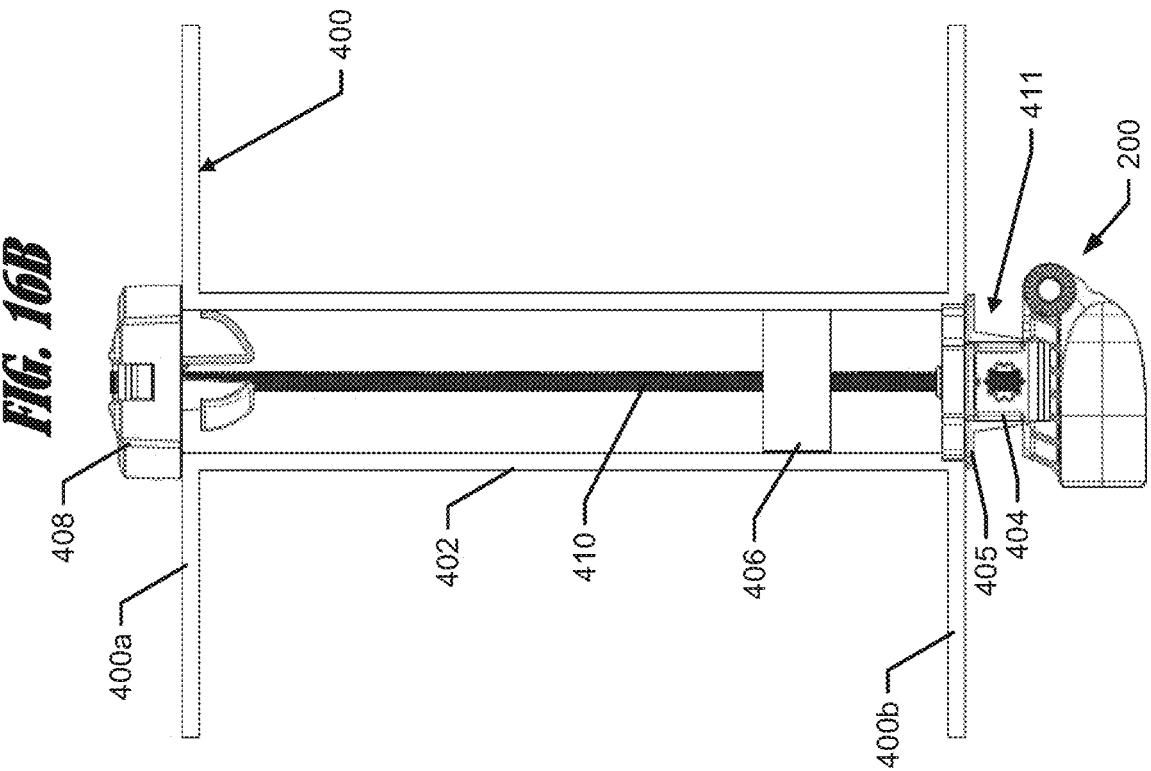
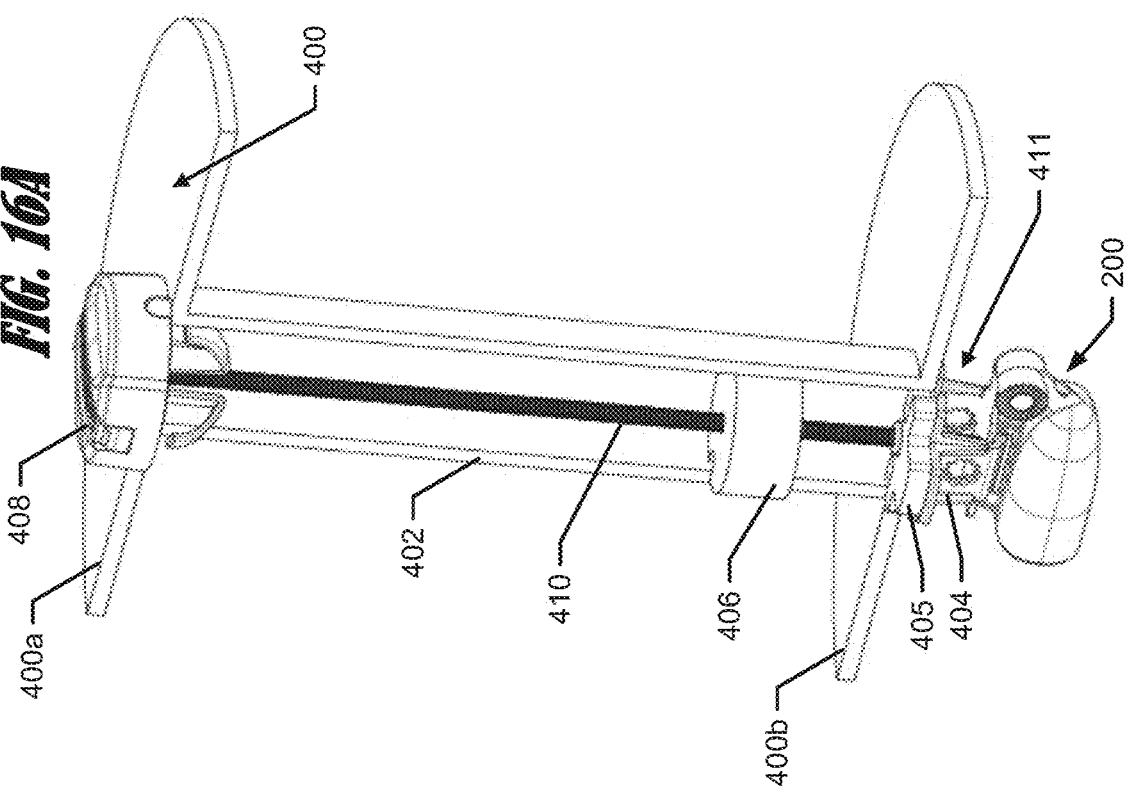

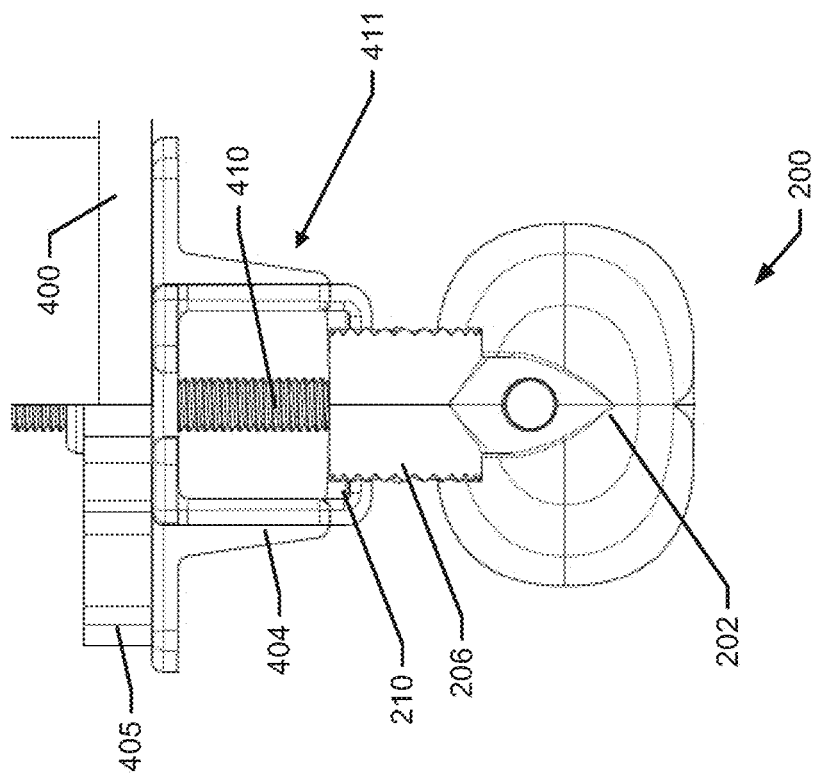

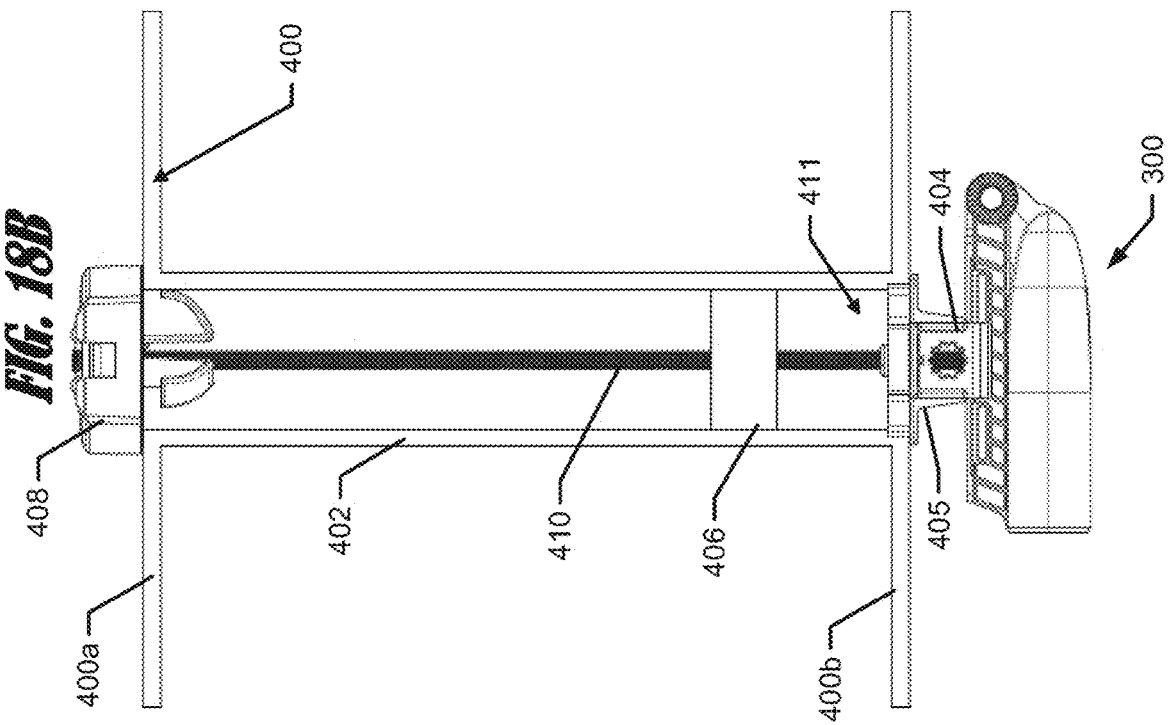
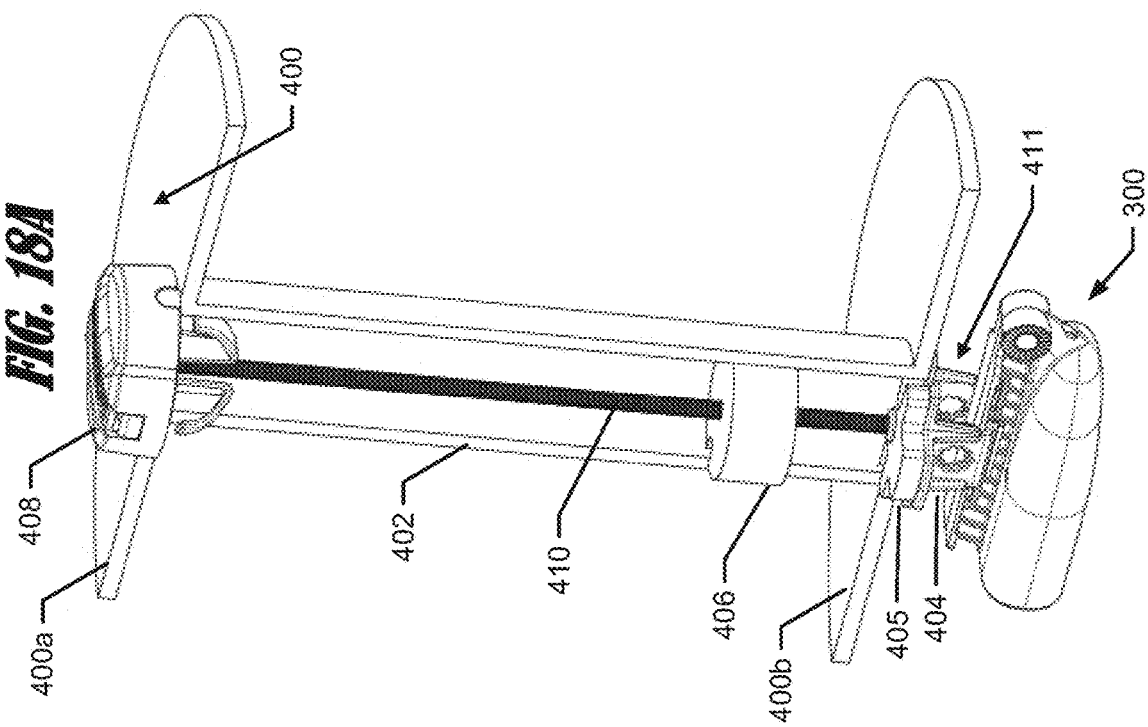

SONAR TRANSDUCER WITH MULTIPLE MOUNTING OPTIONS

FIELD OF THE INVENTION

Embodiments of the present invention relate generally to sonar transducers, and more particularly, to systems and apparatuses for multiple mounting options for a sonar transducer.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. Sonar transducer elements convert electrical energy into sound or vibrations at a particular frequency. A sonar sound beam is transmitted into and through the water and is reflected from objects it encounters. The transducer receives the reflected sound (the "sonar returns") and converts the sound energy into electrical energy. Based on the known speed of sound, it is possible to determine the distance to and/or location of the waterborne or underwater objects. The sonar return signals can also be processed to be displayed on a display device, giving the user a "picture" of the underwater environment.

The signal processor and display may be part of a unit known as a "sonar head" that is connected by a wire to the transducer mounted remotely from the sonar head. Alternatively, the sonar transducer may be an accessory for an integrated marine electronics system offering other features such as GPS, radar, etc.

Mounting of transducers may vary depending on a number of factors, including, for example, the design of the watercraft (e.g. design of the hull), structure, or motor to which it may be mounted. For example, a transducer may be mounted with a transom mounting, a portable mounting, a through-hull mounting, a trolling motor mounting, an over-the-side mounting, or other hull or structure mounting options. Different mountings, however, require different features and often optimizing features for one type of mounting may create difficulties or be undesirable for another type of mounting.

BRIEF SUMMARY OF THE INVENTION

Since different users desire/need different kinds of mounting options for the sonar transducer, the manufacturer of sonar systems has to either sell the sonar head and the transducer separately, or cause the marine electronics dealer to inventory a number of versions of the same sonar system, the versions often differing only in terms of the configuration of the mounting of the transducer unit. These differences may be mechanical or electrical, or relate to the transducer's capabilities. However, selling the sonar head and transducer unit separately may be confusing for the consumer. One solution has been to sell the sonar system with the most popular type of transducer unit (e.g., configured for a transom mount) and allow the customer to exchange the transducer unit for another type if needed. This, however, requires extra effort for the customer and the dealer.

To avoid such a problem and create ease for the customer, embodiments of the present invention provide systems and apparatuses for multiple different mounting options for the transducer assembly. In some embodiments, the housing of the transducer assembly may integrally include multiple mounting options for a watercraft, such as for hull (e.g. bottom or side) mounting, transom mounting, trolling motor mounting, through-hull mounting, etc. In some embodiments, the mount fitting may include multiple mounting options, such as for transom mounting and trolling motor mounting.

In an example embodiment, a transducer assembly is provided including a housing configured to retain at least one sonar transducer. The housing includes a body having at least a top, a bottom, a first end, and a second end. The housing also includes a first mounting feature integral to the housing and disposed proximate the first end of the housing. The first mounting feature is configured to mount the housing to a hull of watercraft to facilitate at least a first type of mounting. The housing further includes a second mounting feature integral to the housing and formed proximate the top of the body of the housing. The second mounting feature is configured to mount the housing to at least one of a watercraft or a trolling motor to facilitate at least one second type of mounting and the at least one second type of mounting is different than the first type of mounting.

In another example embodiment, a sensor housing is provided including a body having at least a top, a bottom, a first end, and a second end, a first mounting feature integral to the sensor housing and disposed proximate the first end of the sensor housing. The first mounting feature is configured to mount the sensor housing to a hull of watercraft to facilitate at least a first type of mounting. The sensor housing also includes a second mounting feature integral to the sensor housing and formed proximate the top of the body of the sensor housing. The second mounting feature is configured to mount the housing to at least one of a watercraft or a trolling motor according to at least one second type of mounting and the at least one second type of mounting is different than the first type of mounting.

In a further example embodiment, a transducer mounting system is provided including a transducer assembly including a housing configured to retain at least one sonar transducer. The housing includes a body having at least a top, a bottom, a first end, and a second end. The housing also includes a first mounting feature integral to the housing and disposed proximate the first end of the housing. The first mounting feature is configured to mount the housing to a hull of watercraft to facilitate at least a first type of mounting. The housing further includes a second mounting feature integral to the housing and formed proximate the top of the body of the housing. The second mounting feature is configured to mount the housing to at least one of a watercraft or a trolling motor according to at least one second type of mounting and the at least one second type of mounting is different than the first type of mounting. The transducer mounting system also includes at least one fastener band, at least one fastener, and a mount fitting configured to be mounted to the hull of the watercraft and receive the first mounting feature.

In yet another example embodiment, a transducer mounting system is provided including a transducer assembly including a housing configured to retain at least one sonar transducer. The housing includes a body having at least a top, a bottom, a first end, and a second end. The housing also includes a mounting feature integral to the housing and disposed proximate the first end of the housing. The transducer mounting system also includes at least one fastener band, at least one fastener, and a mount fitting configured to receive the mounting feature. The mount fitting is configured to be either mounted to a hull to according to a first type of mounting or mounted to a trolling motor according to a second type of mounting that is different than the first type of mounting.

In an example embodiment, the first mounting feature includes a first portion of a pivot joint configured to be mated with a complementary second portion of the pivot joint. The first and second portions of the pivot joint are configured to be mated by a compression element and the compression element, when tightened, is configured to exert a force to compress the first portion of the pivot joint and the second portion of the pivot joint together to increase friction therebetween to limit rotational displacement between the first portion of the pivot joint and the second portion of the pivot joint. In some example embodiments, the second mounting feature includes a vertical extension integral to the housing and extending outwardly and away from the top of the body of the housing, and the vertical extension is disposed along a longitudinal axis of the housing. In an example embodiment, the second mounting feature also includes at least one band aperture disposed through the vertical extension, wherein the at least one band aperture is configured to receive a fastener band therethrough to facilitate the at least one second type of mounting. In some example embodiments, the vertical extension defines a proximal end and a distal end. The distal end is opposite the top of the body of the housing and the second mounting feature includes a horizontal extension disposed at the distal end of the vertical extension. The horizontal extension extends in a plane that is different than a plane of the vertical extension. The horizontal extension includes a flange including a plurality of fastener apertures configured to receive a fastener therethrough to facilitate the at least one third type of mounting. The at least one third type of mounting is different than the first type of mounting and the second type of mounting. In some example embodiments, the horizontal extension includes a T bracket configured to be received by a T slot mount to facilitate at least one fourth type of mounting. The at least one fourth type of mounting is different than the first type of mounting, the second type of mounting, and the third type of mounting. In an example embodiment, the T slot mount includes a threaded rod configured to engage a top face of the T bracket, such that tightening the threaded rod exerts force on the T bracket against the T slot mount to thereby limit movement of the housing relative to the T slot mount.

In an example embodiment, the vertical extension defines a proximal end and a distal end. The distal end is opposite the top of the body of the housing and the second mounting feature includes a horizontal extension disposed at the distal end of the vertical extension. The horizontal extension extends in a plane that is different than a plane of the vertical extension. In some example embodiments, the horizontal extension includes a curve complementary to either a bottom of the watercraft or a bottom of the trolling motor. In an example embodiment, the horizontal extension includes a flange including a plurality of fastener apertures configured to receive a fastener therethrough to facilitate the at least one second type of mounting. In some example embodiments, at least one of the plurality of fastener apertures is disposed proximate the first end of the housing and at least one other of the plurality of fastener apertures is disposed proximate the second end of the housing.

In some example embodiments, the transducer assembly also includes a wiring aperture disposed in the housing to enable passage of a wire connected to the one or more sonar transducers and a sealing element disposed in the wiring aperture to create a water proof seal around the wire. In some example embodiments, the transducer assembly also includes a mounting block configured to be coupled at a first end to the first mounting feature and coupled at a second end to the watercraft. The coupling between the second end of the mounting block and the watercraft includes an adhesive bond. In some example embodiments, the coupling between the second end of the mounting block and the watercraft does not include fasteners. In some example embodiments, transducer assembly also includes a shim configured to be disposed between the mounting block and the watercraft. The shim has a first thickness at a first shim end and a second thickness at a second shim end and the first thickness is larger than the second thickness. In some example embodiments, the shim is configured to align the second end of the mounting block such that a longitudinal direction of extension of the housing is parallel with a longitudinal direction of extension of the watercraft when mounted.

In some example embodiments, the first end has a hydrodynamic profile.

In some example embodiments, the bottom is curved to limit resistance to water flow.

In some example embodiments, the mount fitting further includes a mounting face and a mounting band aperture extending through the mounting face and the mounting band aperture is configured to receive the at least one fastener band therethrough to facilitate the second type of mounting. In some example embodiments, the mounting face includes a curve complementary to at least one of a transom of the watercraft, a bottom of the watercraft, or a bottom of the trolling motor.

In some example embodiments, the second portion of the pivot joint includes a mounting band aperture extending therethrough. The mounting band aperture is configured to receive the at least one fastener band therethrough to facilitate the second type of mounting.

Some example embodiments of the present invention includes example housings and mounting systems described herein. The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Figure 1:
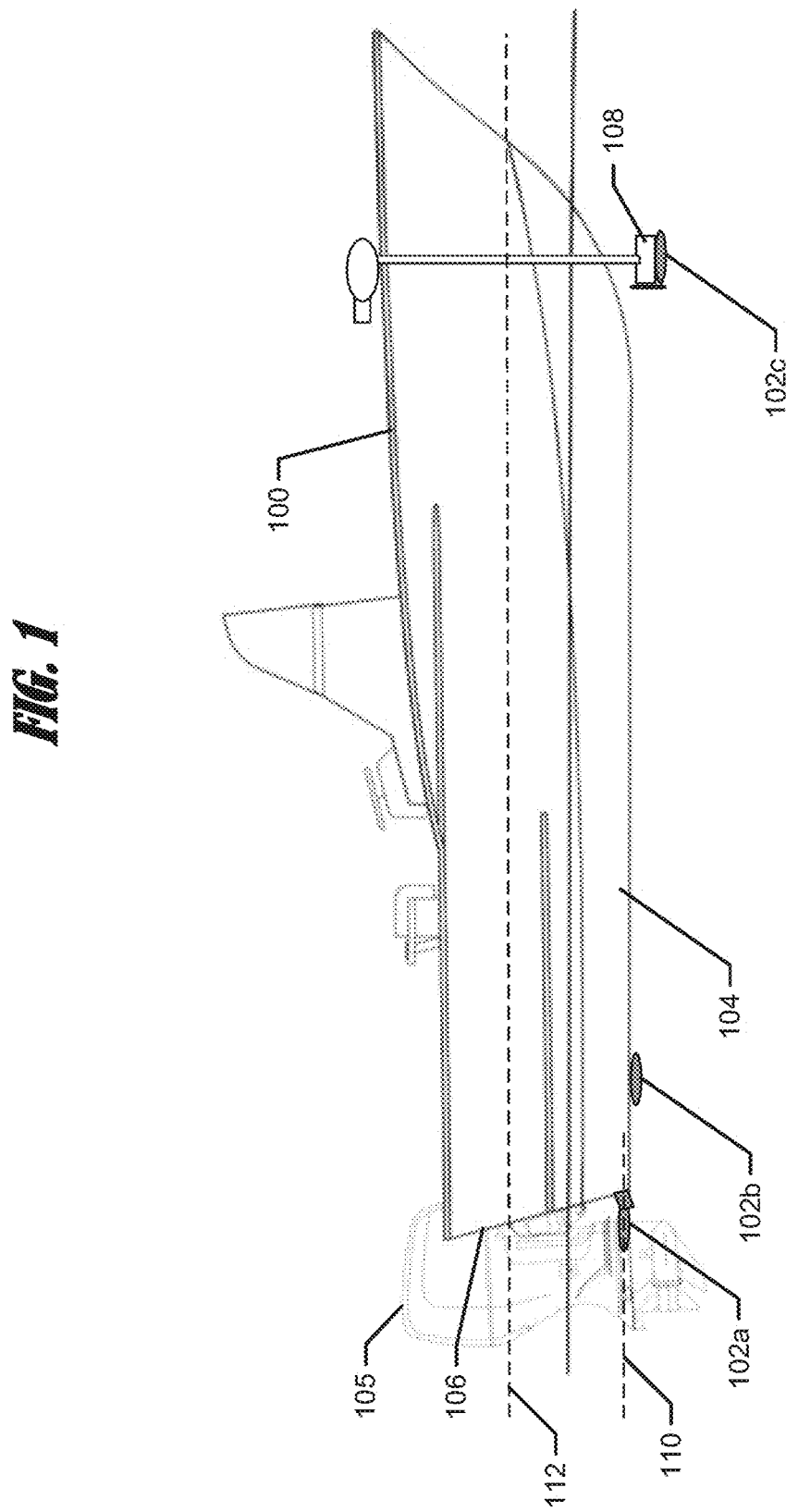
Figure 6:
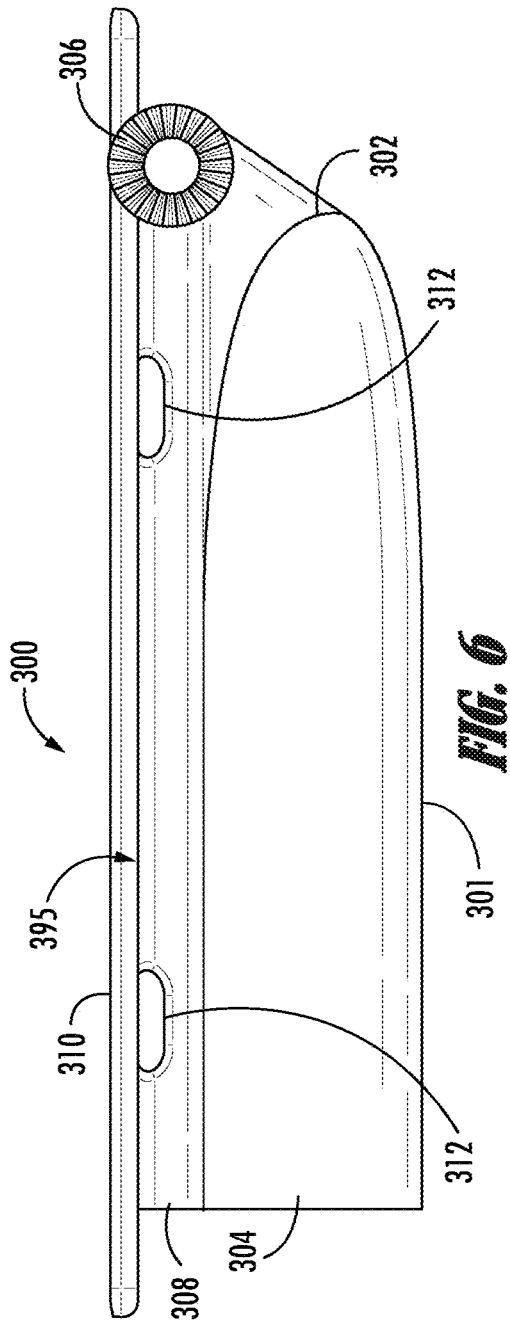
Figure 19:
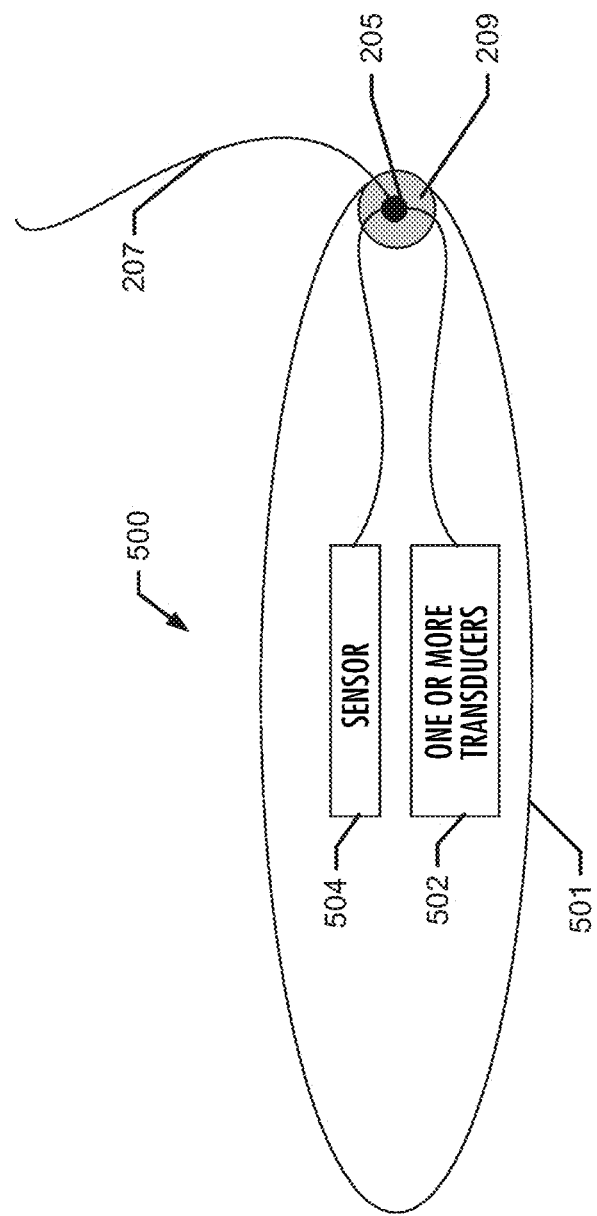

Having thus described the invention in general terms, reference will now be made to the accompanying drawings, which are not necessarily drawn to scale, and wherein:

FIG. 1 illustrates an example watercraft in accordance with some embodiments discussed herein;

FIGS. 2 and 3 illustrate example perspective views of various example transducer assemblies in accordance with some embodiments discussed herein;

FIGS. 4A, 4B, 5A, and 5B illustrate example front and side views of various example transducer assemblies in accordance with some example embodiments discussed herein;

FIGS. 6-10 illustrate side views of example mountings of an example transducer assembly in accordance with some example embodiments discussed herein;

FIGS. 11A, 11B, 12A, and 12B illustrate example trolling motor mounting of various example transducer assemblies in accordance with some embodiments discussed herein;

FIGS. 13A, 13B, 14A, and 14B illustrate example transom mounting of various example transducer assemblies in accordance with some example embodiments discussed herein;

FIGS. 15A and 15B illustrate an alternative example trolling motor mounting of various example transducer assemblies in accordance with some example embodiments discussed herein;

FIG. 15C illustrates a head-on view of an example mount fitting mounted to a trolling motor in accordance with some example embodiments discussed herein;

FIG. 15D illustrates an example mount fitting and fastener band in accordance with some example embodiments discussed herein;

FIGS. 16A, 16B, 17, 18A, and 18B illustrate example through-hull mounting of various example transducer assemblies in accordance with some example embodiments discussed herein; and FIG. 19 illustrates an example block diagram of a transducer assembly in accordance with some example embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

With reference to FIG. 1, a watercraft, e.g. vessel 100, configured to traverse a marine environment, e.g. body of water 101, may use a sonar transducer assembly 102 disposed on and/or proximate to the vessel. The vessel 100 may be a surface watercraft, a submersible watercraft, or any other implementation known to those skilled in the art. The transducer assembly 102 may include one or more transducers, which are described in reference to FIG. 19 below. The one or more transducers may be utilized to emit and receive sound waves to generate a sonar image of the environment under the surface of the water.

In some example embodiments, a vessel 100 may include a main propulsion motor 105, such as an outboard or inboard motor. Additionally or alternatively, the vessel 100 may include a trolling motor 108 configured to propel the vessel 100 and/or maintain a position. The one or more transducer assemblies 102 may be mounted in various positions and to various portions of the vessel 100 and/or equipment associated with the vessel 100 (shown for example as 102a, 102b, and 102c). For example, the transducer assembly 102 may be mounted to the transom of the vessel 100, such as depicted by transducer assembly 102a; may be mounted to the bottom or side of the hull 104 of the vessel 100, such as depicted by transducer assembly 102b; and/or may be mounted to the trolling motor 108, such as depicted by transducer assembly 102c. Additionally or alternatively, the transducer assembly 102 may be mounted to a through-hull mount, such as used on a kayak, as depicted in FIGS. 16A-18B below.

The transducer assembly 102 may include a housing that includes multiple mounting features that facilitate different types of mounting, e.g. transom, hull, trolling motor, through-hull, or the like. In some embodiments, such as described herein, the mounting features are integrally formed with the housing. In some embodiments, the housing may be configured to retain one or more transducers and may be affixed to the vessel 100, trolling motor 108, or other structure such that the longitudinal direction of extension of the housing 110 is approximately parallel with the longitudinal direction of extension of the vessel 112.

FIGS. 2, 4A, and 4B illustrate an example transducer assembly 200 in accordance with some embodiments. The transducer assembly 200 may include a housing 201 having a body including a top 298, a bottom 299, a first end (e.g. a leading end) 202, and a second end (e.g. a trailing end) 204.

In some embodiments, the housing 201 may include a wire aperture 205 enabling an electronic cable 207 to pass through the housing 201. The electronic cable 207 may enable data communication between one or more transducers and/or sensors within the housing and a remote device, such as a marine electronic device. In some embodiments, the wire aperture 205 may include a sealing element configured to create a water tight seal about the electronic wire 207 to prevent entrance of water or foreign material into the housing 201.

In some embodiments, the leading edge 202 and/or the bottom 299 of the housing 201 may include a curve and/or hydrodynamic profile to limit resistance to water flow of the transducer assembly 200.

In some embodiments, one or more mounting features may be integrally formed and/or attached proximate the top 298 of the housing 201. In this regard, in the depicted embodiment, the example transducer assembly 200 includes a first mounting feature 206 and a second mounting feature 295 that are each integrally formed with the housing 201. As detailed herein, in some embodiments, the first mounting feature 206 may be configured to facilitate at least a first type of mounting for the transducer assembly 200 and the second mounting feature 295 may be configured to facilitate at least a second, different type of mounting for the transducer assembly 200. As such, in some embodiments, a transducer assembly (such as transducer assembly 200) may be configured to optionally enable at least two different types of mounting for a purchaser—all without the user having to change mount fixtures, as both the first mounting feature and the second mounting feature are integrally formed with the housing of the transducer assembly.

In some example embodiments, such as those depicted in FIGS. 3, 5A, and 5B, the housing 301 may be elongated, such as to provide additional space, such as for more components and/or larger components (e.g., more transducers, additional sensors, and/or different configurations of the one or more transducers and/or sensors). FIG. 3 illustrates an example perspective view of an elongated transducer assembly 300 and FIGS. 5A and 5B illustrate example front and side views of the elongated transducer assembly 300 in accordance with some embodiments. The transducer assembly 300 may be substantially similar to the transducer assembly 200, with variations noted below in reference to specific mounting features. In this regard, reference numerals used herein may be similar, using the 200s for the transducer assembly 200 and the 300s for the transducer assembly 300. For example, FIGS. 6-10 depict side views of the example elongated transducer assembly 300 mounted using different types of mountings, as discussed below. In this regard, in some embodiments, the mounting of the transducer assembly 200 is substantially similar to the mounting of the elongated transducer assembly 300.

In some embodiments, the first mounting feature 206 may be integral to the housing 201 and disposed proximate the first end 202 of the housing 201 (although the first mounting feature 206 need not be integral in some embodiments). The first mounting feature 206 may be a structure that is configured to enable mounting the housing 201 to a hull of a watercraft 100 to facilitate at least a first type of mounting (e.g., transom mounting, portable mounting, etc.). For example, the first mounting feature may be a portion of a pivot joint, a ratchet pivot or gimbal, or the like.

In some embodiments, the first mounting feature 206 may include a portion of a pivot joint, which may be substantially cylindrical. The first mounting feature 206 may be configured to be mated with a complementary mount portion 214 of a mount fitting 217, as depicted in FIGS. 13A and 13B. The mount fitting 217 may be configured to be affixed to the transom 106 or other position on the hull 104 of the vessel, such as by a fastener, epoxy, adhesive, suction cup, or the like (see e.g., the fastener 313 depicted in FIG. 7). In the depicted embodiment of FIG. 7, the first mounting feature 306 (e.g., the first portion of a pivot joint) is disposed between a set of engagement surfaces of the mount portion 314 (e.g., the second portion of the pivot joint), which may be mated by a compression element 316, such as a bolt, screw, or the like. The compression element 316, may be disposed through an aperture in the first mounting feature 306 and/or the mount portion 314, such that, when tightened, the compression element 316 exerts a force to compress the first mounting feature 306 and mount portion 314. The compressive force of the compression element 316 may increase the friction between the first mounting feature 306 and the mount portion 314 to limit or prevent rotation of the first mounting feature 306 relative to the mount portion 314.

In some example embodiments, with reference to FIG. 13A, a locking coupler 215 may be utilized about the mated surfaces of the first mounting feature 206 and the mount portion 214 of the pivot joint. The locking coupler 215 may be configured to engage the opposite surface when the compression element 216 is tightened to further increase fiction between the first mounting feature 206 and the mount portion 214. The locking coupler 215 may include a set of teeth disposed on a mating surface of the first mounting feature 206, a mating surface of the mount portion 214, or both. In such embodiments in which both the first mounting feature 206 and the mount portion 214 of the pivot joint include the locking coupler 215, the sets of teeth may be complementary, such as saw or sine wave shaped teeth. The teeth may enable a ratchet like engagement, thereby preventing rotation when the compression element 216 is tightened, such that the teeth are engaged with each other. The teeth may also, however, allow pivoting when the compression element 216 is not tightened, such that the teeth rotate past each other.

FIGS. 14A and 14B depict transom mounting of the elongated transducer assembly 300 in a manner substantially similar to the transom mounting of the transducer assembly 200 discussed above.

In addition to the multiple mounting types enabled by transducer assembly 200, 300 discussed above, some embodiments of the present invention provide a mount fitting 317' that may include one or more features to enable different types of mounting of the transducer assembly 200, 300 or, in some embodiments, a transducer assembly 300' that does not have multiple mounting options integrated therein.

Turning to FIGS. 15A-15D, the mount fitting 317' may, additionally or alternatively, enable a second type of mounting (in addition to transom mounting), such as being configured to be affixed to the trolling motor 108 associated with the vessel 100. The transducer assembly 300' may include a mounting feature 306' that is substantially similar to the first mounting feature 306, as described above in reference to FIGS. 13A and 13B. The first mounting feature 306' (e.g., the first portion of a pivot joint) is disposed between a set of engagement surfaces of the mount portion 314' (e.g., the second portion of the pivot joint), which may be mated by a compression element 316', as described above in reference to FIGS. 13A and 13B.

The mount fitting 317' includes a mounting face 323 or mounting plate configured to abut a mounting surface of the transom 106, hull 104, or the trolling motor 108 when installed. The mount fitting 317' may include one or more mounting band apertures 325 configured to receive, for example, a fastener band 218, such as a hose clamp, metal strap, cable tie, or the like for facilitating mounting of the transducer assembly 300' to the trolling motor 108. In an example embodiment, the mounting band apertures 325 may extend through the mounting face 232, as depicted in FIGS. 15A-15C. Additionally or alternatively, the mounting band apertures 325 may extend through a portion of the mount fitting 317' perpendicular to the mounting face 323, such as through extensions or arms of the mount portion 314'. The fastener band 218 may extend around the periphery of the trolling motor 108 and through the one or more mounting band apertures 325. The fastener band 218 may be tightened about the trolling motor 108, such as by rotating a hose clamp screw 327, which may engage one or more thread apertures disposed in the fastener band 218.

In some example embodiments, with reference to FIG. 15C, the mounting face 323 may be curved such as to be complementary to the circumference 329 of the outer periphery of the trolling motor 108. The curve of the mounting face 323 may facilitate increased stability in the mounting of the transducer assembly 300', which may in turn limit or prevent movement of the transducer assembly 300'. Additionally or alternatively, the mounting face 323 of the mount fitting 317' may be formed of a semi-rigid material, such as rubber, plastic, or the like. The semi rigid mounting face 323 may enable flexion of the mounting face 323 to allow the mount fitting 317' to be mounted to a generally flat surface of the transom 106 or the hull 104 of a vessel 100 as well as the various diameters of various trolling motors 108. In some embodiments, the semi rigid nature of the mounting face 323 may enable inversion of the mounting face 323 to enable mounting to concave surfaces, such as a concave transom 106 or hull 104.

The mount fitting 317' is depicted with a conventional transducer assembly merely for illustrative purposes. One of ordinary skill in the art would immediately appreciate that the mount fitting 317', configured for multiple mounting types may also be used with a transducer assembly 200, 300 configured for multiple mounting types, thus enabling further mounting types or configurations of mounting types.

In some embodiments, the second mounting feature 295 may be integral to the housing 201 and formed proximate the top 298 of the housing 201 (although the second mounting feature 295 need not be integral in some embodiments). The second mounting feature 295 may be a structure that is configured to facilitate at least a second type of mounting (e.g., trolling motor mounting, hull mounting, thru-hull mounting, etc.). For example, the second mounting feature may include one or more structures that each enable a different type of mounting (such as described herein).

In some example embodiments, the second mounting feature 295 may include a vertical extension 208 integral to and extending outwardly and away from the top 298 of the housing 201 and disposed along a longitudinal axis of the housing 201. The vertical extension 208 may define a proximal end 208a and a distal end 208b. The proximal end 208a is defined proximate the top 298 of the housing 201 and the distal end 208b is defined opposite of the top 298 of the body of the housing 201.

In some embodiments, the vertical extension 208 may include one or more band apertures 212 configured to receive, for example, a fastener band 218, such as a hose clamp, metal strap, cable tie, or the like, such as depicted in FIGS. 11A and 11B (e.g., for facilitating tolling motor mounting). The fastener band 218 may affix the transducer assembly 200 to a trolling motor 108 or other portion of the vessel 100. The band apertures 212 may extend through the vertical extension 208 and substantially perpendicularly to the direction of extension of the vertical extension 208. In some embodiments, the band apertures 212 may be elongated in the longitudinal direction of extension of the housing 110, such as to enable the fastener band 218 to lay flat in the band aperture 212.

In embodiments of the elongated transducer assembly 300, the vertical extension 308 may include two or more band apertures 212 disposed at least at either end of the vertical extension 308. The transducer assembly 300 may thereby be affixed to a trolling motor 108, such as depicted in FIGS. 9, 12A, and 12B with at least two fastener bands 218, which may prevent or limit rotational torsion applied to the fastener bands 218 by the housing 301 due to water flow.

In some example embodiments, the second mounting feature 208 may include a horizontal extension 210 disposed at the distal end 208b of, and integral to, the vertical extension 208 opposite the top 298 of the housing 201. In some embodiments, the horizontal extension 210 may extend perpendicularly to the vertical extension 208 and substantially parallel with a direction of extension of the housing 201 (although other directions are contemplated).

In some embodiments, the vertical extension 208 and the horizontal extension 210 may be substantially T shaped. In some example embodiments, with reference to FIG. 8, the horizontal extension 310 may be a flange including a plurality of fastener apertures 393, each being configured to receive a fastener 319, such as a screw, a bolt, or the like. The fasteners 319 may affix the horizontal extension 310 to the vessel 100 (e.g., to a hull 104 of the vessel 100), such as the bottom or side of the hull 104. In some embodiments, the horizontal extension 310 may have a curve on a face opposing the housing 301. The curve of the horizontal extension 310 may be complementary to the curve of a trolling motor 108 and/or hull 104 of the vessel 100, such that the horizontal extension 310 maximizes contact area between the horizontal extension 310 and the mounting surface of the hull 104 or trolling motor 108.

With reference to FIG. 10, in some embodiments, the first mounting feature 306 may include a mounting block 320 configured to be coupled at an end 321 to the transom 106 of the watercraft 104. The mounting block 220 may be glued, molded, bolted, or otherwise affixed to the first mounting feature 306. In an example embodiment, the end 321 of the mounting block 320 may be a substantially flat surface perpendicular to the longitudinal direction of extension of the housing 301. The end 321 of the mounting block 320 may be affixed to the hull 104, e.g. the transom 106 of the vessel 100 by epoxy, adhesive, or other suitable bonding agent.

In some circumstances, the transom 106 of the hull 104 may generally have a slope toward the vessel 100 as the transom 106 extends toward and into the water. In some embodiments, to ensure that the mounting for the transducer assembly 300 is substantially parallel with the longitudinal direction of extension of the hull 104, one or more shims 322 may be provided. The shims 322 may be configured to align the end 321 of the mounting block 320, such that a longitudinal direction of extension of the housing 301 is parallel with a longitudinal direction of extension of the vessel when the transducer assembly 300 is mounted to the vessel 100. In such a regard, in some embodiments, the shims 322 may be a first thickness at a first end 322a and a second, different thickness at a second end 322b, such that each shim 322 forms a wedge, such as may be of substantially the same area as the end 321 of the mounting block 320. In this regard, one or more shims 322 may be used to compensate for the slope of the transom 106. When multiple shims 322 are utilized, the plurality of shims 322 may each be affixed to each other, such as by adhesive, epoxy, or the like.

FIGS. 16A, 16B, 17, 18A, and 18B illustrate example through-hull mounting of the transducer assembly 200, 300 in accordance with some example embodiments. In some example embodiments, the vessel 100, such as a kayak, may have a hull 400 with an upper hull wall 400a and lower hull wall 400b. A scupper hole 402 may be disposed in the hull 400 between the upper and lower hull walls. In the depicted embodiment, a kayak mount 411 may include a threaded rod or screw 410 that passes through the scupper hole 402 of the hull 400. The screw 410 may be attached to a kayak mounting adapter 405 or may pass through a threaded hole in the kayak mounting adapter 405. A tension element 408 (e.g., a turn-able cap) may be disposed at the opposite end of the screw 410 from the kayak mounting adapter 405. In some embodiments, when tightened, the tension element 408 may cause the screw 410 to apply a force on the kayak mounting adapter 405 against the lower wall of the hull 400, which may seal the scupper hole 402. In some embodiments the tension element 408 may include a nut, such as a wing nut or a hexagonal nut, and a protective cap covering the nut.

A stopper 406 may be positioned between the kayak mounting adapter 405 and the upper wall of the hull 400 to provide sealing of the scupper hole 402 and/or to guide the electrical cable 207 to prevent or limit entanglement of the electronic cable 207 with the screw 410. Additionally, the stopper 406 may maintain the position of the screw 410, such as substantially centered, inside the scupper hole 402. In some embodiments, a protective cap may be positioned around the nut and/or screw for protection and/or aesthetic purposes.

With reference to FIG. 17, the kayak mounting adapter 405 may include a set of L shaped arms 404, which are configured to engage an under side of the horizontal extension 210 of the housing 201. The screw 410, as discussed above, may pass through the kayak mounting adapter 405, such that an end of the screw engages the top of the horizontal extension 210. The opening created by the set of L shaped arms 404 and the engaging end of the screw 410 may form a T slot. A complementary T bracket may be formed by the vertical extension 208 and the horizontal extension 210. The T bracket of the vertical extension 208 and horizontal extension 210 may be received by the T slot of the L shaped arms 404 and the screw 410. In some embodiments, the screw 410 may be tightened, such as by turning the tension element 408, which may cause the screw 410 to exert force on the horizontal extension 210 against the L shaped arms 404, e.g. exert force on the T bracket against the T slot, thereby limiting or preventing movement of the housing 210 relative to the L shaped arms 404 of the kayak mounting adapter 405.

Figure 7:
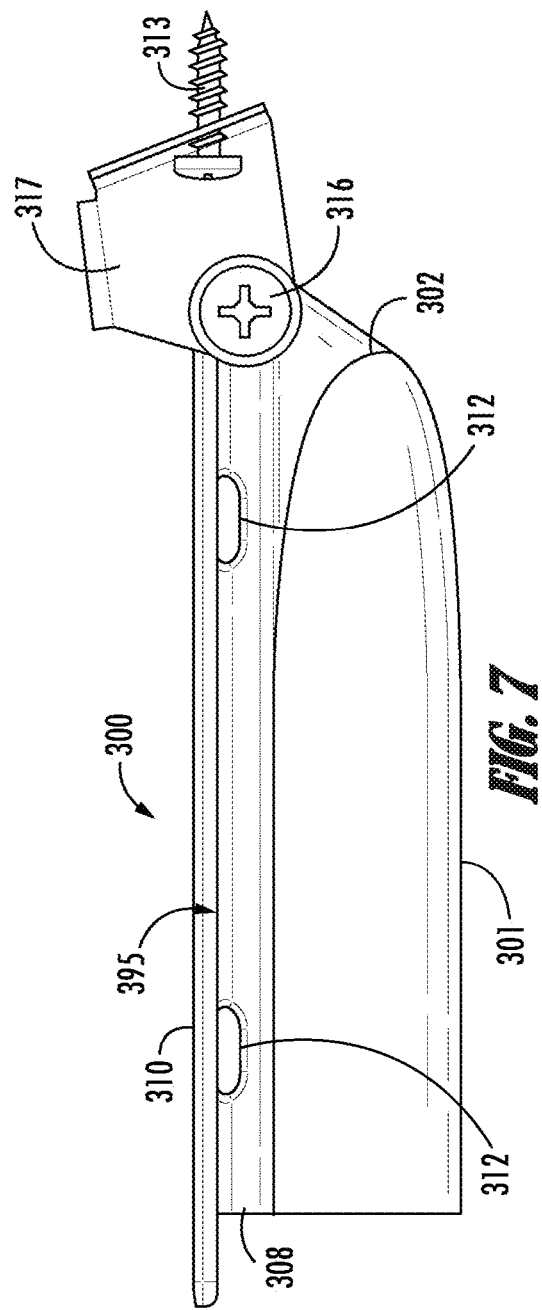

As described herein, some embodiments of the present invention provide a transducer assembly that is formed with multiple mounting features that facilitate optional mounting types for the transducer assembly. For example, FIGS. 7-9 illustrate at least three different types of mounting that can be facilitated without altering the transducer assembly housing. For example, FIG. 7 illustrates transom mounting (e.g., a first type of mounting) using the first mounting feature 306; FIG. 8 illustrates hull mounting (e.g., a second type of mounting) using the second mounting feature 395; and FIG. 9 illustrates trolling motor mounting (e.g., a third type of mounting) using the second mounting feature 395. A possible fourth type of mounting may be a portable mounting that utilizes a suction cup to mount the housing to a hull of watercraft using the first mounting feature, similar to what is shown in FIG. 7. A possible fifth type of mounting is kayak mounting, which is illustrated and described with respect to FIGS. 16A, 16B, 17, 18A, and 18B. A sixth type of mounting is another type of transom mounting that utilizes a mounting block and shims, such as shown in FIG. 10. Further, some embodiments contemplate other or various combinations of the above described types of mountings, all using a single transducer assembly housing.

Example System Architecture

FIG. 19 shows a block diagram of an example transducer assembly 500. The transducer assembly 500 may be substantially similar to transducer assembly 102, transducer assembly 200, or transducer assembly 300. The transducer assembly 500 may include a housing 501 similar to housing 201, 301 discussed in FIGS. 2-18B that is configured to retain at least one transducer 502. In some embodiments, the transducer assembly 500 may also include one or more sensors 504 configured to measure one or more environmental parameters. The sonar transducer(s) 502 and/or the sensor(s) 504 may output data (e.g., to a marine electronic device associated with the vessel 100) for processing and/or usage via an electronic cable 507, e.g. wire. The housing 501 may include a wiring aperture 205, such as disposed in the leading end, to enable passage of the electronic cable 207. In some example embodiments, the housing 501 may also include one or more sealing elements 209, such as a rubber grommet or plug, which may be disposed in the wiring aperture 205 to create a waterproof seal around the electronic cable 207.

The one or more transducers 502 may be configured to project one or more sonar beams into the underwater environment. Sonar pulses of the sonar beams may reflect off objects within the water (e.g., the bottom surface, fish, submerged objects, etc.) and return to the one or more transducers 502 to provide sonar returns that can be converted into sonar images for display, such as on a user interface of a marine multifunction device (MFD). Each of the one or more transducers 502 may include one or more transducer elements. Such transducers may be any type of transducer and in any orientation. Some example transducers include a linear transducer, a conical transducer, etc. Further, some example orientations include facing generally downward (e.g., downscan), generally to one or more sides of the housing 501 (e.g., sidescan), and/or facing generally forward (e.g., forwardscan). In some embodiments, the one or more transducers may form arrays, such as a phased array, multi-element array, etc. In this regard, the housing 501 may be configured to retain any type of transducer system, including various combinations of types and orientations of transducers.

The sensor 504 may measure one or more parameters of the underwater environment. Example sensors 504 may include one or more of a water temperature sensor, water current sensor, speed sensor, acoustic sensor, or any other suitable sensor. The sensors 504 may provide measured parameter data to a remote device, such as a marine electronics device of a vessel. An example application of such measured parameter data is for display on a user interface of the marine electronics device.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A transducer assembly comprising:
a housing, wherein the housing comprises a body having at least a top, a bottom, a first end, and a second end; and
at least one sonar transducer positioned within the housing and aimed to emit one or more sonar beams therethrough,
wherein the housing comprises:
an opening positioned in the first end, wherein a cable extends from an internal portion of the housing through the opening and out of the first end, wherein the cable enables data communication between the at least one sonar transducer and a remote device;
a first mounting feature integrally formed with the housing and disposed proximate the first end of the housing, wherein the first mounting feature is configured to mount the housing to a hull of watercraft to facilitate at least a first type of mounting, wherein the first mounting feature is disposed at a vertical height along the first end above the opening;
a second mounting feature integrally formed with the housing and formed proximate the top of the body of the housing, wherein the second mounting feature is configured to mount the housing to at least one of a watercraft or a trolling motor to facilitate at least one second type of mounting, wherein the at least one second type of mounting is different than the first type of mounting, wherein the second mounting feature comprises:
a vertical extension integrally formed with the housing and extending outwardly and away from the top of the body of the housing, wherein the vertical extension is disposed along a longitudinal axis of the housing, wherein the vertical extension defines a proximal end and a distal end, wherein the distal end is opposite the top of the body of the housing; and at least one band aperture disposed through the vertical extension, wherein the at least one band aperture is configured to receive a fastener band therethrough to facilitate the at least one second type of mounting; and a third mounting feature integrally formed with the housing, wherein the third mounting feature is configured to mount the housing to at least one of a watercraft or a trolling motor to facilitate at least one third type of mounting, wherein the at least one third type of mounting is different than the first type of mounting and the second type of mounting, wherein the third mounting feature comprises a rigid horizontal extension disposed at the distal end of the vertical extension, wherein the horizontal extension extends in a flat plane that is different than a plane of the vertical extension, wherein the horizontal extension comprises a flange including a plurality of fastener apertures configured to receive a fastener therethrough to facilitate the at least one third type of mounting.

2. The transducer assembly according to claim 1, wherein the first mounting feature comprises:

a first portion of a pivot joint configured to be mated with a complementary second portion of the pivot joint, wherein the first and second portions of the pivot joint are configured to be mated by a compression element, wherein the compression element, when tightened, is configured to exert a force to compress the first portion of the pivot joint and the second portion of the pivot joint together to increase friction therebetween to limit rotational displacement between the first portion of the pivot joint and the second portion of the pivot joint.

3. The transducer assembly of claim 1, wherein the horizontal extension comprises a T bracket configured to be received by a T slot mount to facilitate at least one fourth type of mounting, wherein the at least one fourth type of mounting is different than the first type of mounting, the second type of mounting, and the third type of mounting.

4. The transducer assembly of claim 3, wherein the T slot mount includes a threaded rod, wherein the threaded rod is configured to engage a top face of the T bracket such that tightening the threaded rod exerts force on the T bracket against the T slot mount to thereby limit movement of the housing relative to the T slot mount.

5. The transducer assembly of claim 1, wherein at least one of the plurality of fastener apertures is disposed proximate the first end of the housing and at least one other of the plurality of fastener apertures is disposed proximate the second end of the housing.

6. The transducer assembly of claim 1 further comprising:
a sealing element disposed in the opening to create a water proof seal around the wire.

7. The transducer assembly of claim 1 further comprising:
a mounting block configured to be coupled at a first end to the first mounting feature and coupled at a second end to the watercraft, wherein the coupling between the second end of the mounting block and the watercraft comprises an adhesive bond.

8. The transducer assembly of claim 7, wherein the coupling between the second end of the mounting block and the watercraft does not include fasteners.

9. The transducer assembly of claim 7 further comprising:
a shim configured to be disposed between the mounting block and the watercraft, wherein the shim has a first thickness at a first shim end and a second thickness at a second shim end, and wherein the first thickness is larger than the second thickness.

10. The transducer assembly of claim 9, wherein the shim is configured to align the second end of the mounting block such that a longitudinal direction of extension of the housing is parallel with a longitudinal direction of extension of the watercraft when mounted.

11. The transducer assembly of claim 1, wherein the first end has a hydrodynamic profile.

12. The transducer assembly of claim 1, wherein the bottom is curved to limit resistance to water flow.

13. The transducer assembly of claim 1, wherein the first end is a leading end.

14. A sensor housing for retaining a sonar transducer, the sensor housing comprising:

a body having at least a top, a bottom, a first end, and a second end, wherein the body is configured to retain the sonar transducer proximate the bottom;

an opening positioned in the first end, wherein a cable extends from an internal portion of the body through the opening and out of the first end, wherein the cable enables data communication between the sonar transducer and a remote device;

a first mounting feature integrally formed with the sensor housing and disposed proximate the first end of the sensor housing, wherein the first mounting feature is configured to mount the sensor housing to a hull of watercraft to facilitate at least a first type of mounting, wherein the first mounting feature is disposed at a vertical height along the first end above the opening;

a second mounting feature integrally formed with the sensor housing and formed proximate the top of the body of the sensor housing, wherein the second mounting feature is configured to mount the housing to at least one of a watercraft or a trolling motor according to at least one second type of mounting, wherein the at least one second type of mounting is different than the first type of mounting, wherein the second mounting feature comprises:

a vertical extension integrally formed with the housing and extending outwardly and away from the top of the body of the housing, wherein the vertical extension is disposed along a longitudinal axis of the housing, wherein the vertical extension defines a proximal end and a distal end, wherein the distal end is opposite the top of the body of the housing; and at least one band aperture disposed through the vertical extension, wherein the at least one band aperture is configured to receive a fastener band therethrough to facilitate the at least one second type of mounting; and a third mounting feature integrally formed with the sensor housing, wherein the third mounting feature is configured to mount the housing to at least one of a watercraft or a trolling motor according to at least one third type of mounting, wherein the at least one third type of mounting is different than the first type of mounting and the second type of mounting, wherein the third mounting feature comprises a rigid horizontal extension disposed at the distal end of the vertical extension, wherein the horizontal extension extends in a flat plane that is different than a plane of the vertical extension, wherein the horizontal extension comprises a flange including a plurality of fastener apertures configured to receive a fastener therethrough to facilitate the at least one third type of mounting.

15. A transducer mounting system comprising:
a transducer assembly comprising:
- a housing, wherein the housing comprises a body having at least a top, a bottom, a first end, and a second end; and
- at least one sonar transducer positioned within the housing and aimed to emit one or more sonar beams therethrough,
wherein the housing comprises:
  - an opening positioned in the first end, wherein a cable extends from an internal portion of the housing through the opening and out of the first end, wherein the cable enables data communication between the at least one sonar transducer and a remote device;
  - a first mounting feature integrally formed with the housing and disposed proximate the first end of the housing, wherein the first mounting feature is configured to mount the housing to a hull of watercraft to facilitate at least a first type of mounting, wherein the first mounting feature is disposed along the first end at a vertical height above the opening;
  - a second mounting feature integrally formed with the housing and formed proximate the top of the body of the housing, wherein the second mounting feature is configured to mount the housing to at least one of a watercraft or a trolling motor according to at least one second type of mounting, wherein the at least one second type of mounting is different than the first type of mounting, wherein the second mounting feature comprises:
    - a vertical extension integrally formed with the housing and extending outwardly and away from the top of the body of the housing, wherein the vertical extension is disposed along a longitudinal axis of the housing, wherein the vertical extension defines a proximal end and a distal end, wherein the distal end is opposite the top of the body of the housing; and
    - at least one band aperture disposed through the vertical extension, wherein the at least one band aperture is configured to receive a fastener band therethrough to facilitate the at least one second type of mounting; and
  - a third mounting feature integrally formed with the housing, wherein the third mounting feature is configured to mount the housing to at least one of a watercraft or a trolling motor according to at least one third type of mounting, wherein the at least one third type of mounting is different than the first type of mounting and the second type of mounting, wherein the third mounting feature comprises a rigid horizontal extension disposed at the distal end of the vertical extension, wherein the horizontal extension extends in a flat plane that is different than a plane of the vertical extension, wherein the horizontal extension comprises a flange including a plurality of fastener apertures configured to receive a fastener therethrough to facilitate the at least one third type of mounting;
at least one fastener band;
at least one fastener; and
a mount fitting configured to be mounted to the hull of the watercraft and receive the first mounting feature.

16. The transducer mounting system of claim 15, wherein the mount fitting is configured to be either mounted to the hull according to a fourth type of mounting or mounted to a trolling motor according to a fifth type of mounting that is different than the fourth type of mounting.

17. The transducer mounting system of claim 16, wherein the mount fitting further comprises a mounting face and a mounting band aperture extending through the mounting face, wherein the mounting band aperture is configured to receive the at least one fastener band therethrough to facilitate the second type of mounting.

* * * * *